(12) United States Patent
Kumar et al.

(10) Patent No.: US 7,933,834 B2
(45) Date of Patent: Apr. 26, 2011

(54) INTERACTIVE BILL PAYMENT CENTER

(75) Inventors: Srihari Kumar, Santa Clara, CA (US);
Satyen Desai, San Bruno, CA (US);
John Kelley, Palo Alto, CA (US); Blake Earl Hayward, Redwood Shores, CA (US); Jennifer Green Scott, San Francisco, CA (US); Senthil Kumar Pandurangan, San Jose, CA (US)

(73) Assignee: Yodlee.com, Inc., Redwood City, CA (US)

( * ) Notice: Subject to any disclaimer, the term of this patent is extended or adjusted under 35 U.S.C. 154(b) by 17 days.

(21) Appl. No.: 12/501,733

(22) Filed: Jul. 13, 2009

(65) Prior Publication Data
US 2010/0005025 A1   Jan. 7, 2010

Related U.S. Application Data

(60) Division of application No. 09/785,929, filed on Feb. 16, 2001, which is a continuation-in-part of application No. 09/698,708, filed on Oct. 27, 2000, now Pat. No. 7,672,879, which is a continuation-in-part of application No. 09/425,626, filed on Oct. 22, 1999, now Pat. No. 6,802,042, which is a continuation-in-part of application No. 09/323,598, filed on Jun. 1, 1999, now Pat. No. 6,199,077, which is a continuation-in-part of application No. 09/208,740, filed on Dec. 8, 1998, now Pat. No. 6,412,073.

(51) Int. Cl.
*G06Q 40/00* (2006.01)
(52) U.S. Cl. ................ 705/42; 705/35; 705/38; 705/39; 705/40; 705/30; 235/379
(58) Field of Classification Search .................... 705/35, 705/30, 38–42; 707/500
See application file for complete search history.

(56) References Cited

U.S. PATENT DOCUMENTS 5,465,206 A * 11/1995 Hilt et al. .................. 705/40
(Continued)

OTHER PUBLICATIONS

Preserving Competition in Electronic Home BankingAuthor(s): Paul M. HorvitzSource: Journal of Money, Credit and Banking, vol. 28, No. 4, Part 2: Payment SystemsResearch and Public Policy Risk, Efficiency, and Innovation (Nov. 1996), pp. 971-974Published by: Blackwell PublishingStable URL: http://www.jstor.org/stable/2077933Accessed: Dec. 17, 2010.*

*Primary Examiner* — Ella Colbert
*Assistant Examiner* — Daniel L Greene, Jr.
(74) *Attorney, Agent, or Firm* — Donald R. Boys; Central Coast Patent Agency, Inc.

(57) ABSTRACT

A software suite for enabling viewing and manipulation of multiple categories of aggregated data compiled from a plurality of data sources and accessible through a single interfacing node operated on a data-packet-network is provided. A bill-payment module is provided within the software suite and comprises, an interactive main interface accessible from the module for listing the bills due and payment accounts, an interactive history link embedded in the main interface for providing access to a secondary interface for viewing bill history, an interactive set-up link embedded in the main interface for providing access to a secondary interface for configuring recurring payments, an interactive transfer-funds link embedded in the main interface for providing access to a secondary interface for enabling automated transfer of funds between registered accounts, an interactive calendar link embedded in the main interface for providing access to a secondary interface for viewing calendar data, a plurality of interactive drop-down menus, each menu associated with a listed bill, the menus providing upon invocation a plurality of selectable, interactive options for treating the listed bill and an interactive refresh-all link embedded in the main interface for enabling selective or complete data refreshing of data displayed in the interface. A user operating the main interface from a remote node having access to the data-packet-network may view all aggregated bills and initiate treatment of such bills according to selected interactive options. The treatment is ordered by the operating user and performed by proxy by a service entity hosting the interface.

11 Claims, 29 Drawing Sheets

U.S. PATENT DOCUMENTS

| | | | |
|---|---|---|---|
| 5,483,445 A * | 1/1996 | Pickering | 705/40 |
| 5,649,115 A * | 7/1997 | Schrader et al. | |
| 5,699,528 A * | 12/1997 | Hogan | |
| 5,878,405 A * | 3/1999 | Grant et al. | |
| 5,903,881 A * | 5/1999 | Schrader et al. | |
| 5,920,847 A * | 7/1999 | Kolling et al. | |
| 6,070,150 A * | 5/2000 | Remington et al. | |
| 6,078,902 A * | 6/2000 | Schenkler | |
| 6,078,907 A * | 6/2000 | Lamm | |
| 6,141,333 A * | 10/2000 | Chavez, Jr. | |
| 6,317,783 B1 * | 11/2001 | Freishtat et al. | 709/218 |
| 6,385,595 B1 * | 5/2002 | Kolling et al. | |
| 6,859,212 B2 * | 2/2005 | Kumar et al. | |
| 2002/0002536 A1 * | 1/2002 | Braco | 705/40 |
| 2002/0026396 A1 * | 2/2002 | Dent et al. | 705/35 |
| 2002/0082990 A1 * | 6/2002 | Jones | 705/40 |

\* cited by examiner

My Dashboard

YODLEE CALENDAR — 231

| DAY | WEEK | MONTH | YEAR |

◁ JULY 2000 ▷

| Su | Mo | Tu | We | Th | Fr | Sa |
|---|---|---|---|---|---|---|
| 25 | 26 | 27 | 28 | 29 | 30 | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 | 1 | 2 | 3 | 4 | 5 |

Today is July 18th, 2000

Add

Show:
- ☑ Auctions
- ☑ Shopping
- ☑ Travel
- ☑ Bills
- ☐ Banking
- ☑ Credit Cards
- ☑ Investments ◁ JULY 18-24, 2000 ▷          Print

233

Tuesday July 18th
5:00pm UBid: Auction closing - item Golf Clubs High Bid: $240

Wednesday July 19th
6:00am United Airlines: Flight Departure - Flight # UAL 490 Departing SFO
10:00am Hilton Hotel Reservations: Room Booked - New York Hilton, Single Room

Thursday July 20th
All Day CitiBank MasterCard: Bill Due - Amt. $2400

Friday July 21st
6:00am - 9:00am Tee Time - Silver Vista Golf Club. Call Jim.

Saturday July 22nd
All Day Amazon.com: Back Order 1209043 Due to Ship - Item Harry Potter Price: $20
All Day Pacific*Bell: Bill Due - Amt. $100

Sunday July 23rd
All Day PG&E: Bill Due - Amt. $100.34

Monday July 24th
All Day American Express: Bill Due - Amt. $1200.30

Click on an Account to log in

*Fig. 12*

My Dashboard — CONSOLIDATED PORTFOLIO TRACKER

Tuesday, July 18th

Your Yodlee Consolidated Portfolio

| Symbol | Name | Quantity | Price | Est. Value | View Individual Holdings | |
|---|---|---|---|---|---|---|
| DELL | Dell Computer Systems | 1500 | 46.345 | $68,517.50 | Charles Schwab ▽ | Go |
| CSCO | Cisco Systems | 2000 | 66.062 | $132,124.00 | Charles Schwab ▽ | Go |
| MSFT | Microsoft Corporation | 1200 | 70.453 | $84,543.60 | Merill Lynch ▽ | Go |
| INTC | Intel Corporation | 3000 | 138.3 | $414,800.00 | Roth IRA ▽ | Go |
| ORCL | Oracle Corporation | 4500 | 75 | $337,500.00 | Fidelity 401k ▽ | Go |
| EXDS | Exodus Communications | 200 | 85.47 | $17,084.00 | Fidelity 401k / Roth IRA / Merill Lynch | Go |

TOTAL POSITION VALUE: $1,125,196.00

Include the following Accounts:
- ☑ Charles Schwab
- ☐ TD Waterhouse
- ☑ Fidelity 401k
- ☑ Roth IRA
- ☑ E*TRADE
- ☑ Merill Lynch 271, 273, 275, 279

Bill Payment Center

My Dashboard

| BILL PAYMENT CENTER | | | | | | Dashboard |
|---|---|---|---|---|---|---|
| View History | Recurring Payments | Pay Anyone | Transfer Funds | Calendar | Preferences | Refresh All |

Bill Inbox

| Due Date | Payee | Account # | Amount Due | Balance | Refresh Status | Bill Toolbox |
|---|---|---|---|---|---|---|
| 07/20/2000 | Citibank MasterCard | 123456-xxx | $2400.00 | $2400.00 | 6 hours ago | View Bill ▽ |
| 07/22/2000 | Pacific*Bell | 515 555 1212 | $ 300.45 | $ 100.23 | 8 hours ago | View Bill |
| | | | | | 1 hour ago | Pay Bill |
| 07/23/2000 | PayPal - jsmith@acme.com | joe@visto.com | $ 100.34 | $ 100.34 | 2 hours ago | Mark as Paid |
| | | | | | | Delete |
| 07/24/2000 | American Express | 3154-548-543 | $1000.00 | $ 1609.00 | | Advice |
| | | | | | | Alerts |
| 07/25/2000 | EBay: Big Bertha Driver | Item# 528088 | $ 175.00 | N/A | 6 min ago | View Bill ▽ |
| 07/28/2000 | Sallie Mae | 2456789 | $ 250.00 | $ 15,000.00 | 1 day ago | |
| 07/30/2000 | State Farm Insurance | 47899-9325 | $ 65.35 | N/A | 4 hours ago | View Bill ▽ |
| 08/05/2000 | Countrywide Home Loans | 38521-2528 | $ 2,754.34 | $ 253,404.23 | 25 min ago | View Bill ▽ |

Payment Accounts

| Account Name | Account Number | Account Type | Account Balance | Refresh Status |
|---|---|---|---|---|
| Wells Fargo | 2586-3566 | Checking | $4,344.23 | 6 hours ago |
| Bank of America | 478-586-586 | Savings | $13,334.34 | 3 hours ago |
| PayPal | joe@visto.com | P2P | $(75.00) | 1 hour ago |
| E*Trade | HX-54875 | Checking | $25,253.25 | 2 hours ago |

*Fig. 18*

Mark as Paid - Input form

My Dashboard
Dashboard

BILL PAYMENT CENTER

| View History | Recurring Payments | Pay Anyone | Transfer Funds | Calendar | Preferences | Refresh All |

Bill Inbox

| Due Date | Payee | Account # | Amount Due | Balance | Refresh Status | Bill Toolbox |
|---|---|---|---|---|---|---|
| 07/20/2000 | Citibank MasterCard | 123456-xxx | $2400.00 | $2400.00 | 6 hours ago | View Bill |
| 07/22/2000 | Pacific*Bell | | | | 8 hours ago | View Bill / Pay Bill / Mark as Paid / Delete / Advice / Alerts |
| 07/23/2000 | PayPal - jsmith@acme.com | | | | 1 hour ago | View Bill |
| 07/24/2000 | American Express | | | | 2 hours ago | |
| 07/25/2000 | EBay: Big Bertha Driver | | | | 6 min ago | |
| 07/28/2000 | Sallie Mae | | | | 1 day ago | View Bill |
| 07/30/2000 | State Farm Insurance | | | | 4 hours ago | View Bill |
| 08/05/2000 | Countrywide Home Loans | | | | 25 min ago | View Bill |

333

Mark as Paid - Input Form
Biller : Pacific*Bell
Amount Due: $300.45
Account Balance : $400.28
Due Date: 07/22/00

Payment Date: 07/20/00
Account Debited: Citibank Checking
Amount to Pay: $300.45
Purpose: Utilities Cancel | Mark Paid

Payment Accounts

| Account Name | Account Number | | | | Refresh Status |
|---|---|---|---|---|---|
| Wells Fargo | 2586-3566 | Checking | $4,344.23 | | 6 hours ago |
| Bank of America | 478-586-586 | Savings | $13,334.34 | | 3 hours ago |
| PayPal | joe@visto.com | P2P | $(75.00) | | 1 hour ago |
| E*Trade | HX-54875 | Checking | $25,253.25 | | 2 hours ago |

Time/Debit Configure Interface

My Dashboard [YODLEE]
[Dashboard]

CREDIT CARD CALCULATORS

Choose a credit card calculator: [How long will it take to pay off my balance? ▽]

How long will it take to pay off my balance?

Inputs (These fields have been pre-filled using your existing account info)

| | | |
|---|---|---|
| Amount Now Owed | $ | 2,400 |
| Future Monthly Charges | $ | 1,500 |
| Future Monthly Payments | $ | 1,700 |
| Annual Rate | % | 9.99 |
| Annual Fee | $ | 0 |
| Desired Months Until Pay Off | | 6 |

Future Rate Change:
- ○ None
- ● An Increase of [1] % per year
- ○ A Decrease of [ ] % per year

Results  [Table]

By paying off your debt now, you will save $138 in interest costs per year

In order to pay off your $2,400 balance in the desired 6 months, you'll need to increase your monthly payments to $1,913 and cease making further charges to your card.

Otherwise, given your anticipated payments of $1,700, you'll repay your outstanding balance in 13 months

[Bar chart: Months to Pay Off vs Monthly Payment Amount]

View Bill Payment History

My Dashboard

[Dashboard]

BILL PAYMENT CENTER

Bill Payment History - Last 10 Payments and Transfers

| Date Paid | Status | Payee | Paid From Account | Amount Paid |
|---|---|---|---|---|
| 07/20/2000 | Pending | John Smith (jsmith@acme.com) | PayPal | $100.34 |
| 07/20/2000 | Pending | Pacific*Bell | Citibank Checking | $300.45 |
| 07/20/2000 | Pending | Citibank MasterCard | Citibank Checking | $2400.00 |
| 07/16/2000 | Pending | MCI Worldcom | Fidelity MMA | $33.08 |
| 07/16/2000 | Complete | John Smith (jsmith@acme.com) | PayPal | $100.00 |
| 07/15/2000 | Complete | State Farm Insurance | Fidelity MMA | $240.00 |
| 07/14/2000 | Complete | Funds Transfer from E*TRADE | Prudential | $1,000.00 |
| 07/13/2000 | NSF | Funds Transfer from BankOne | E*TRADE | $531.34 |
| 07/13/2000 | Rejected | Patty Neal (patty@hotmail.com) | BillPoint | $32.15 |
| 07/12/2000 | Complete | Discover Card | Citibank Checking | $3,234.00 |

Next 10 payments

Transfer Funds

My Dashboard  [Dashboard]

TRANSFER FUNDS

Transfer Funds

| TRANSFER | FROM: | TO: |
|---|---|---|
| $ 500 | Wells Fargo Banking - 1234567-xxx ▽ | BankOne - 2308036708 ▽ |
| ON: | BankOne - 2308036708 | BankOne - 23080367708 |
| 09/20/00 | E*TRADE - 98765 - 43xx | E*TRADE - 08765 - 43xx |
| | Wells Fargo Banking - 1234567-xxx | Wells Fargo Banking - 1234567-xxx |
| | Wells Fargo Banking - 7374848-xxx | Wells Fargo Banking - 7372652-xxx |

Add a New Account    [Cancel]    [Transfer Funds] — 341

Pending Transfers

| Transfer Date | From | To | Amount: |
|---|---|---|---|
| 03/08/00 | Wells Fargo Banking 1234567890-xxx | E*TRADE - 987654321-xxx | $ 5000.00 |

[Inquire]

Last 10 Payments and Transfers

| Date | Status | From Account | Payee | Amount |
|---|---|---|---|---|
| 09/08/00 | Pending | Wells Fargo Banking | Funds Transfer to E*TRADE | $ 5000.00 |
| 08/12/00 | Complete | Fidelity MMA | Landloard | $1,500.00 |
| 08/11/00 | Complete | Wells Fargo Banking | AT&T | $32.67 |
| 08/11/00 | Complete | Wells Fargo Checking | Pac Bell | $33.03 |
| 08/10/00 | Complete | PayPal | John Smith | $100.00 |
| 08/10/00 | Complete | Fidelity MMA | State Farm Insurance | $240.00 |

Active Balance    Edit List

| Wells Fargo Banking - 1234567-xxx | ☒ |
|---|---|
| Current Balance | $ 3,000.26 |
| Wells Fargo Mastercard | ($ 2,400.00) |
| Final Balance | $ 600.25 |

| BankOne - 23980339798 | ☒ |

Pay Bill x.com PAYPAL

My Account | Help | Log Out

Overview | Add Funds | Send Money | Request Money | Withdraw Funds | Web Tools | History | Profile | Auction Tools | Referrals Money Request Details Request Received From
jsmith@acme.com To
joe@vista.com Subject
THE MONEY YOU OWE ME Note Status
Pending amount
$ 100.34

☐ Click here if you would like a receipt of this transaction sent via e-mail

[ Pay ] [ Cancel Money Request ] [ Return to My Account ] — 350

View Bill

CitiPlaza ◻ Account Online ◻ Financial Solutions ◻ Credit Matters ◻ Security Advice ◻ Privacy ◻ U.S. Cards Home

Citi citibank
Statements *account*
ONLINE

Account Summary Home

Account Summary
Unbilled Activity
Statements
Make a payment

Account Management
Express Request
Help/Contact Us
Feedback

Log off

355

Billed Transactions for account XXX-XXXX-XXX3.03 for period endiong 07/16/00

Quick Refrence

| | |
|---|---|
| Minimum payment due: | $20.00 |
| Payment due date: | 07/20/00 |
| Credit Limit: | $8500.00 |
| Available credit: | $7100.00 |

Activity Summary

| | |
|---|---|
| Previous Balance: | $162.46 |
| Payments and Adjustments: | $102.46 |
| Purchases: | $2400.00 |
| Cash Advances and Checking: | $0.00 |
| Finance Charges: | $0.00 |
| New Balance: | $2400.00 |

The following transactions have been posted to your account for this statement.

Payments and Adjustments

| Trans Date | Post Date | Description | Amount |
|---|---|---|---|
| 07/02/00 | 07/02/00 | Maryland CFR Payment | $182.46 |

1 transaction $182.46

Purchases, Cash Advances and Checks, and Fees

*Fig. 28*

INTERACTIVE BILL PAYMENT CENTER

CROSS-REFERENCE TO RELATED DOCUMENTS

The present invention is a divisional application of co-pending patent application Ser. No. 09/785,929, filed Feb. 16, 2009, which is a continuation in part (CIP) to patent application Ser. No. 09/698,708 entitled "Interactive Activity Interface for Managing Personal Data and Performing Transactions Over a Data Packet Network" filed on Oct. 27, 2000, which is a CIP to patent application Ser. No. 09/425,626 entitled "Method and Apparatus for Providing Calculated and Solution-Oriented Personalized Summary-Reports to a User through a Single User-Interface" filed on Oct. 22, 1999, which is a CIP to a patent application Ser. No. 09/323,598 entitled "Method and Apparatus for Obtaining and Presenting WEB Summaries to Users" filed on Jun. 1, 1999, which is a CIP to patent application Ser. No. 09/208,740 entitled "Method and Apparatus for Providing and Maintaining a User-Interactive Portal System Accessible via Internet or other Switched-Packet-Network" filed on Dec. 8, 1998, disclosures of which are incorporated herein in their entirety by inclusion and reference.

FIELD OF THE INVENTION

The present invention is in the field of Internet navigation including various communication means and connection technologies. The present invention pertains more particularly to an interactive software interface for enabling management and transactional control of personal data including bill data maintained on behalf of users by an entity providing data compilation, aggregation, and summary services.

BACKGROUND OF THE INVENTION

The information network known as the World Wide Web (WWW), which is a subset of the well-known Internet, is arguably the most complete source of publicly accessible information available. Anyone with a suitable Internet appliance such as a personal computer with a standard Internet connection may access (go on-line) and navigate to information pages (termed web pages) stored on Internet-connected servers for the purpose of garnering information and initiating transactions with hosts of such servers and pages.

Many companies offer various subscription services accessible via the Internet. For example, many people now do their banking, stock trading, shopping, and so forth from the comfort of their own homes via Internet access. Typically, a user, through subscription, has access to personalized and secure WEB pages for such functions. By typing in a user name and a password or other personal identification code, a user may obtain information, initiate transactions, buy stock, and accomplish a myriad of other tasks.

One problem that is encountered by an individual who has several or many such subscriptions to Internet-brokered services is that there are invariably many passwords and/or log-in codes to be used. Often a same password or code cannot be used for every service, as the password or code may already be taken by another user. A user may not wish to supply a code unique to the user such as perhaps a social security number because of security issues, including quality of security that may vary from service to service. Additionally, many users at their own volition may choose different passwords for different sites so as to have increased security, which in fact also increases the number of passwords a user may have.

Another issue that can plague a user who has many passworded subscriptions is the fact that they must bookmark many WEB pages in a computer cache so that they may quickly find and access the various services. For example, in order to reserve and pay for airline travel, a user must connect to the Internet, go to his/her book-marks file and select an airline page. The user then has to enter a user name and password, and follow on-screen instructions once the page is delivered. If the user wishes to purchase tickets from the WEB site, and wishes to transfer funds from an on-line banking service, the user must also look for and select the personal bank or account page to initiate a funds transfer for the tickets. Different user names and passwords may be required to access these other pages, and things get quite complicated.

Although this preceding example is merely exemplary, it is generally known that much work related to finding WEB pages, logging in with passwords, and the like is required to successfully do business on the WEB.

A service known to the inventor and described in patent application Ser. No. 09/208,740 entitled "Method and Apparatus for Providing and Maintaining a User-Interactive Portal System Accessible via Internet or other Switched-Packet-Network", provides a WEB service that allows a user to store all of his password protected pages in one location such that browsing and garnering information from them is much simplified. A feature of the above service allows a user to program certain tasks into the system such that requested tasks are executed by an agent (software) based on user instruction. The service stores user password and log-in information and uses the information to log-in to the user's sites, thus enabling the user to navigate without having to manually input log-in or password codes to gain access to the links.

The above-described service uses a server to present a user-personalized application that may be displayed as an interactive home page that contains all of his listed sites (hyperlinks) for easy navigation. The application lists the user's URL's in the form of hyperlinks such that a user may click on a hyperlink and navigate to the page wherein login, if required, is automatic, and transparent to the user.

The application described above also includes a software agent that may be programmed to perform scheduled tasks for the user including returning specific summaries and updates about user-account pages. A search function is provided and adapted to cooperate with the software agent to search user-entered URL's for specific content if such pages are cached somewhere in their presentable form such as at the portal server, or on the client's machine.

In addition to the features described above, patent application Ser. No. 09/523,598 entitled "Method and Apparatus for Obtaining and Presenting WEB Summaries to Users" describes a software agent used in conjunction with a search function that is enabled to navigate to any URL or group of URL's, provided as input by a user or otherwise deemed appropriate by the service provider, for the purpose of providing summary information regarding updated content for each URL, which may be presented as an HTML information-page to the user.

The above described service uses known site logic for navigating to specific "chunks" of data contained in Web pages at the site. Logic scripts are prepared by knowledge workers operating on behalf of users. With such scripts, gatherer agents may navigate directly to data portions that users are interested in.

Users who subscribe to many on-line services generally do all of their banking, investing, travel arranging, shopping, and so on while on-line with the Internet. Having all of his or her services available at one portal provides a convenience to a user in not having to remember a plurality of passwords, or to be required to physically log-on to each site. Similarly, the ability to obtain summary data associated with selected sites through one interface allows a user to greatly speed any decision making process related to his or her on-line activity. However, summary information may not help a user with certain other concerns. For example, obtaining accurate financial information concerning his entire portfolio of banking and investments would require much user calculation depending on the exact nature of the result desired. Similarly compiling a trend that reflects a user's on-line activity at a plurality of shopping services may also require considerable calculation to be performed by a user. Summary data presented in the above methods is general in nature and reflects such as updates, status of orders, and the like.

An Internet-connected portal system, known to the inventor, has a data repository, a data-gathering system, a request processor, a plurality of report algorithms, and a report processor. The request processor receives a request from a user and matches the request to an individual one of the report algorithms. The data-gathering subsystem accesses plural Internet sites associated with the user and extracts raw data therefrom according to needs of the report algorithm. The report processor processes the raw data according to the report algorithm into meta-summarized information defined by the report algorithm, and the portal system transmits the meta-summarized information as a report to a destination associated with the report request. In some cases there is an aggregated-data database in the data repository storing aggregated data retrieved for specific users periodically, and the request processor checks the aggregated-data database for needed data before requiring the data-gathering system to retrieve data from the associated Internet sites. In the instance that the needed data is stored in the aggregated-data database, the report is prepared from the aggregated data. Reports may be presented in a form such as to include text and graphic formats.

In view of various functional enhancements including the ability to provide calculative and solution-oriented reporting, it has occurred to the inventor that a single interface, through which summary and detailed data may be viewed and manipulated must be provided that is user-friendly, compact and interlinked in terms of request-to-result functionality wherein access and request actions may be performed by working within any category or department of data that may be available to be viewed through the interface. Current and prior-art interactive interface software used with typical data presentation services lacks the flexibility of providing multiple points of intractability within the interface as well as enabling cross-solution implementation across multiple categories of data viewable through the interface.

The above challenges exist with prior-art services in part because they lack much of the interactive capability required in order to enable a fully functional data interface, especially one that interfaces a user with a wide range of disparate data categories.

A software suite known to the inventor enables viewing and manipulation of multiple categories of aggregated data compiled from a plurality of data sources and accessible through a single interface operated on a data-packet-network. The data sources are available for direct network-access through multiple access points available from within the interface. The software suite comprises a calendar module having at least one display interface for enabling viewing and manipulation of time and date-sensitive calendar data, a transaction module having at least one display interface for enabling viewing and manipulation of financially oriented account data, a portfolio tracking module having at least one display interface for enabling viewing and manipulation of investment oriented account data, a net worth reporting module having at least one display interface for displaying a solution-oriented net worth report compiled from the aggregated data, a bill payment module having at least one display interface for enabling viewing and initiation of payment action regarding current billing data and an account-alert module having at least one display interface for reporting time and event sensitive account alerts related to changes in account data due to occurring events or pre-configured time parameters.

In the present specification the inventors teach and claim novel functionalities of the bill-payment module of the software suite described above.

SUMMARY OF THE INVENTION

In a preferred embodiment of the present invention, a bill payment module is provided as a part of a software suite for enabling viewing and manipulation of multiple categories of aggregated data compiled from a plurality of data sources and accessible through a single interfacing node operated on a data-packet-network. The bill-payment module comprises, an interactive main interface accessible from the module for listing the bills due and payment accounts, an interactive history link embedded in the main interface for providing access to a secondary interface for viewing bill history, an interactive set-up link embedded in the main interface for providing access to a secondary interface for configuring recurring payments, an interactive transfer-funds link embedded in the main interface for providing access to a secondary interface for enabling automated transfer of funds between registered accounts, an interactive calendar link embedded in the main interface for providing access to a secondary interface for viewing calendar data, a plurality of interactive drop-down menus, each menu associated with a listed bill, the menus providing upon invocation a plurality of selectable, interactive options for treating a listed bill and an interactive refresh-all link embedded in the main interface for enabling selective or complete data refreshing of data displayed in the interface.

A user operating the main bill-payment interface from a remote node having access to the data-packet-network may view all aggregated bills and initiate treatment of such bills according to selected interactive options. The treatment is ordered by the operating user and performed by proxy by a service entity hosting the interface.

In a preferred embodiment, the bill payment module is accessed through the Internet network. In this aspect, the plurality of data sources are services accessible over the Internet and subscribed to by the operating user. Also in this aspect, the accessible services are hosted in file servers addressed on the Internet network. In a preferred embodiment, the above-mentioned remote node is a personal computer with accessibility to the Internet and the main and secondary interfaces are provided in the form of hyper-text-markup-language. In another embodiment, the remote node is a cellular telephone with accessibility to the Internet. In still another embodiment, the remote node is a hand-held computer with accessibility to the Internet.

In one aspect, the interactive set-up link provides an additional secondary interface for manually adding new bills to be listed in the main interface for bill payment. In this aspect, the interactive options for treating a listed bill include viewing a full account of the bill, paying the bill, marking the bill has paid, deleting the bill, obtaining advice regarding selected treatment of the bill, and receiving an alert associated with the bill. Obtaining advice regarding selected treatment of the bill includes, in a preferred aspect, calculated and solution-oriented results. In another aspect, selection of the option for viewing a full account of the bill causes automated navigation and log-in to a third party site hosting a full accounting of the bill.

In another aspect of the present invention, an interactive bill-payment system for enabling online management and treatment of itemized bills by proxy over a data-packet-network is provided. The bill payment system comprises, a first server node connected to the network, the server node providing a service-access-point for accessing users, a second server node connected to the network and accessible to the first server node, the second server node providing automated navigation, data procurement, and data aggregation on behalf of the accessing users, a plurality of server nodes connected to the network and accessible to the second server node, the server nodes functioning as data sources for the data procurement and aggregation and a bill-payment software interface installed on the first server node, the interface accessible to the accessing users connected to the network by respective remote computer nodes.

Users accessing the first server node from the remote computer nodes interact with the bill payment interface for the purpose of paying bills and performing other treatments associated with listed bills, the payment and treatments of the listed bills performed by proxy using the functions of the first and second server nodes.

In a preferred embodiment, the interactive bill-payment system is implemented on Internet network. In one aspect, the first server node is a portal server providing personalized interfaces of the form of hyper-text-markup-language interfaces. In this aspect, the plurality of server nodes host services accessible over the Internet and subscribed to by the accessing users. In one embodiment, the remote computer nodes are personal computers with accessibility to the Internet. In another embodiment, the remote computer nodes are cellular telephones with accessibility to Internet. In still another embodiment, the remote computer nodes are hand-held computers with accessibility to the Internet.

In one aspect, the second server node stores aggregated data in a connected data repository held externally from the server. In preferred aspects, the bill-payment software interface is linked to a plurality of secondary interfaces provided in the form of hyper-text-markup-language. The treatments of the listed bills in addition to bill payment include viewing a full account of the bill, marking the bill has paid, deleting the bill, obtaining advice regarding selected treatment of the bill, and receiving an alert associated with the bill. In this aspect, obtaining advice regarding selected treatment of the bill includes calculated and solution-oriented results.

In still another aspect of the present invention, a method for treating personal bills presented in an interactive bill-payment interface by proxy over a data-packet-network is provided. The method comprises the steps of: (a) accessing the interactive bill-payment interface from a remote node connected to the network, (b) selecting a listed bill for a desired treatment, (c) selecting a treatment option from a list of treatment options associated with the listed bill, (d) populating a secondary interface presented as a result of selecting a treatment option, the secondary interface comprising an electronic order form for directing the execution of the treatment and (e) submitting the completed order form for proxy execution.

In a preferred embodiment, method is practiced on the Internet network. In a preferred aspect of the method in step (a), the interactive bill-payment interface is a personalized hyper-text-markup-language interface served by a portal server connected to the network. In one aspect of the method in step (a), the remote node is a personal computer with accessibility to the network. In another aspect, the remote node is a cellular telephone with accessibility to the network. In still another aspect, the remote node is a hand-held computer with accessibility to the network.

In preferred aspects of the method, in step (c), the selected treatment option is one of an option for bill payment, an option for viewing a full account of the bill, and option for marking the bill has paid, and option for deleting the bill, or an option for receiving an alert associated with the bill. In a variant aspect, in step (c), an additional option is presented for obtaining advice regarding the selected treatment option associated with the bill. In this aspect, in step (c), the advice includes calculated and solution-oriented results. In a preferred aspect of the method in step (d), the secondary interface comprises a hyper-text-markup-language interface. In a preferred aspect of the method in step (e), proxy execution of the electronic order form is performed by a back-end software, the software capable of proxy navigation, proxy log-in, proxy data procurement, proxy form population, proxy form submission, and return of treatment execution results including calculated and solution-oriented results.

Now for the first time, a bill-payment module is provided that allows users to treat bills by proxy through a single electronic interface without requiring physical navigation of users to payee site or third party sites to treat bills.

BRIEF DESCRIPTION OF THE DRAWING FIGURES

FIG. 12 is an exemplary screen shot of a secondary interface invoked as a result of user interaction with module 219 of FIG. 11 according to an embodiment of the present invention.

FIG. 15 is an exemplary screen shot of a portfolio tracker interface resulting from invocation of portfolio tracker module 227 of FIG. 11.

FIG. 17 is an exemplary screen shot of the interactive interface suite for enabling multipoint account management capabilities as described in and analogous to suite 211 of FIG. 11.

FIG. 18 is an exemplary screen shot of a secondary interface invoked as a result of user interaction with module 307 of FIG. 17 according to an embodiment of the present invention.

FIG. 19 is an exemplary screen shot of a secondary interface invoked as a result of user interaction with interactive option 319 of FIG. 18 according to an embodiment of the present invention.

FIG. 20 is an exemplary screen shot of a secondary interface invoked as a result of user interaction with option 321 of FIG. 18 according to one embodiment of the present invention.

FIG. 21 is an exemplary screen shot of a secondary interface invoked as a result of user interaction with module 323 of FIG. 18 according to an embodiment of the present invention.

FIG. 22 is an exemplary screen shot of a secondary interface invoked as a result of user interaction with module 329 of FIG. 18 according to an embodiment of the present invention.

FIG. 25 is an exemplary screen shot of an optional third-party interface invoked as a result of user interaction with option 317 of FIG. 18 according to an alternate embodiment of the present invention.

FIG. 28 is an exemplary screen shot of a third-party interface invoked as a result of user interaction with option 315 of FIG. 18 according to an alternate embodiment of the present invention.

DESCRIPTION OF THE PREFERRED EMBODIMENTS

According to a preferred embodiment of the present invention, a unique Internet portal is provided and adapted to provide unique services to users who have obtained access via an Internet or other network connection from an Internet-capable appliance. Such an interface provides users with a method for storing many personal WEB pages and further provides search function and certain task-performing functions. The methods and apparatus of the present invention are taught in enabling detail below.

Figure 1:
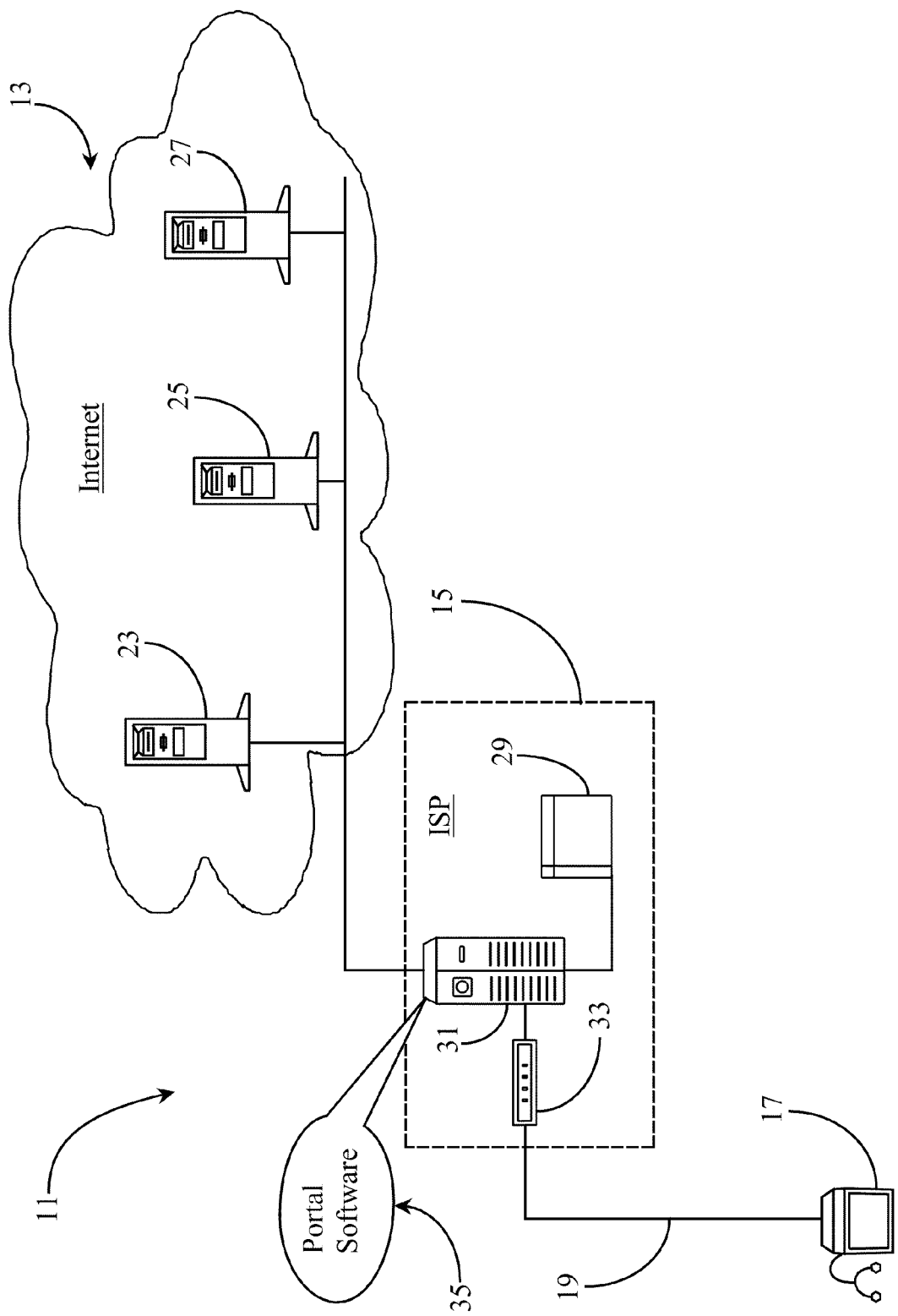
FIG. 1 is an overview of an Internet portal system and network according to an embodiment of the present invention.

FIG. 1 is an overview of an Internet portal system 11 and Internet network 13 according to an embodiment of the present invention. Portal system 11, in this embodiment, operates as an ISP in addition to a unique network portal, but may, in other embodiments be implemented as a stand-alone Internet server. In yet other embodiments the service and apparatus described herein may also be provided by such as a search and listing service (AltaVista™, Yahoo™) or by any other enterprise hosting a WEB-connected server.

Internet 13 is representative of a preferred use of the present invention, but should not be considered limiting, as the invention could apply in other networks and combinations of networks.

ISP 15 in this embodiment comprises a server 31, a modem bank 33, represented here by a single modem, and a mass storage repository 29 for storing digital data. The modem bank is a convenience, as connection to the server could be by another type of network link. ISP 15, as is typical in the art, provides Internet access services for individual subscribers. In addition to well-known Internet access services, ISP 15 also provides a unique subscription service as an Internet portal for the purpose of storing many WEB pages or destinations along with any passwords and or personal codes associated with those pages, in a manner described in more detail below. This unique portal service is provided by execution of Portal Software 35, which is termed by the inventors the Password-All suite. The software of the invention is referred to herein both as the Portal Software, and as the Password-all software suite. Also, in much of the description below, the apparatus of the invention is referred to by the Password-All terminology, such as the Password-All Server or Password-All Portal.

ISP 15 is connected to Internet 13 as shown. Other equipment known in the art to be present and connected to a network such as Internet 13, for example, IP data routers, data switches, gateway routers, and the like, are not illustrated here but may be assumed to be present. Access to ISP 15 is through a connection-oriented telephone system as is known in the art, or through any other Internet/WEB access connection, such as through a cable modem, special network connection (e.g. Ti), ISDN, and so forth. Such connection is illustrated via access line 19 from Internet appliance 17 through modem bank 33.

In a preferred embodiment a user has access to Internet Password-All Portal services by a user name and password as is well known in the art, which provides an individualized WEB page to the subscriber. In another embodiment wherein a user has other individuals that use his or her Internet account, then an additional password or code unique to the user may be required before access to portal 31 is granted. Such personalized Portal WEB pages may be stored in repository 29, which may be any convenient form of mass storage.

Three Internet servers 23, 25, and 27, are shown in Internet 13, and represent Internet servers hosted by various enterprises and subscribed to by a user operating appliance 17. For example, server 23 may be a bank server wherein interactive on-line banking and account managing may be performed. Server 25 may be an investment server wherein investment accounts may be created and managed. Server 27 may be an airline or travel server wherein flights may be booked, tickets may be purchased, and so on. In this example, all three servers are secure servers requiring user ID and password for access, but the invention is not necessarily limited to just secure services.

In a preferred embodiment of the present invention, a subscribing user operating an Internet-capable appliance, such as appliance 17, connects to Password-All Portal system 11 hosted by ISP 15, and thereby gains access to a personalized, interactive WEB page, which in turn provides access to any one of a number of servers on Internet 13 such as servers 23, 25, and 27, without being required to enter additional passwords or codes. In a preferred embodiment the software that enables this service is termed Password-All by the inventors. Password-All may be considered to be a software suite executing on the unique server, and in some instances also on the user's station (client). Additional interactivity provided by portal software 35 allows a connected user to search his listed pages for information associated with keywords, text strings, or the like, and allows a user to program user-defined tasks involving access and interaction with one or more Internet-connected servers such as servers 23, 25, and 27 according to a pre-defined time schedule. These functions are taught in enabling detail below.

Figure 2:
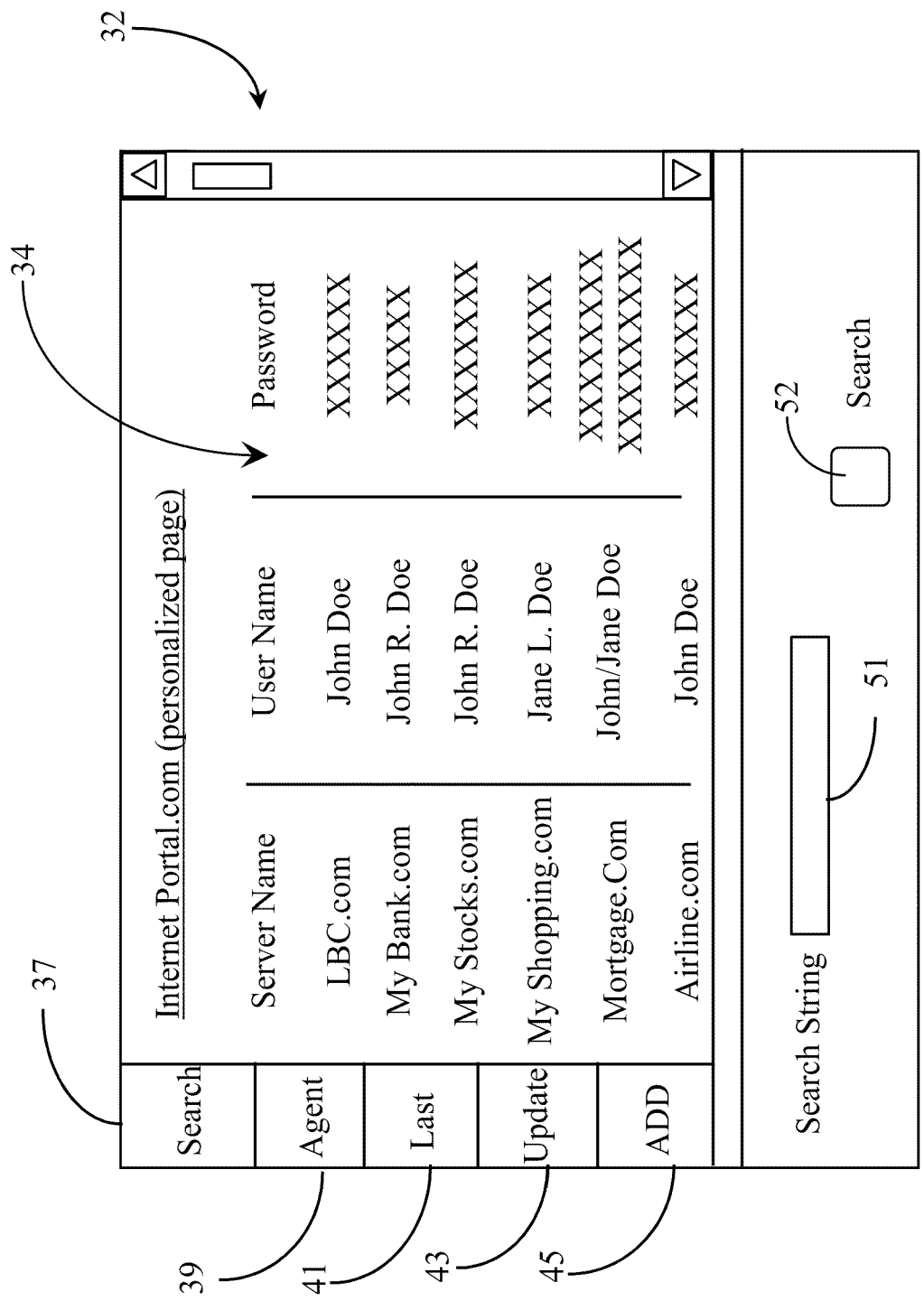
FIG. 2 is an exemplary plan view of a personalized portal home page application as it may be seen on a display monitor according to an embodiment of the present invention.

FIG. 2 is an illustration of a personalized portal page as may be seen on a display monitor according to an embodiment of the present invention, provided by Password-All Portal software 35 executing on server 31, in response to secure access by a subscriber. Page 32 presents an interactive listing 34 of user-subscribed or member WEB pages, identified in this example by URL, but which may also be identified by any convenient pseudonym, preferably descriptive, along with user name and typically encrypted password information for each page. Listed in a first column under destination, are exemplary destinations LBC.com, My Bank.com, My Stocks.com, My shopping.com, Mortgage.com, and Airline.com. These are but a few of many exemplary destinations that may be present and listed as such on page 33. In order to view additional listings listed but not immediately viewable from within application 33, a scroll bar 35 is provided and adapted to allow a user to scroll up or down the list to enable viewing as is known in the art.

Items listed in list 34 in this example may be considered destinations on such as servers 23, 25, and 27 of FIG. 1. Typically the URL associated with an item on this list will not take a user to a server, per se, but to a page stored on a server. User names and password data associated with each item in list 34 are illustrated in respective columns labeled user name, and password, to the right of the column labeled destination. Each listing, or at least a portion of each listing, is a hyperlink invoking, when selected, the URL to that destination. In some instances a particular service may have more than one associated URL. For example, My Bank.com may have more than one URL associated for such as different accounts or businesses associated also with a single subscriber. In this case there may be a sub-listing for different destinations associated with a single higher-level listing. This expedient is not shown, but given this teaching the mechanism will be apparent to those with skill in the art.

In some embodiments one page 33 may be shared by more than one user, such as a husband and wife sharing a common account and subscription. An instance of this is illustrated herein with respect to the server labeled Mortgage.com wherein both a John and a Jane Doe are listed together under the column labeled user name. In another embodiment, a network of individuals, perhaps business owners, authorized co-workers, investment parties, or the like may share one application. In this way, system 11 may be adapted for private individuals as well as business uses.

After gaining access to application 33 which is served via Internet portal server 31 of FIG. 1, a user may scroll, highlight, and select any URL in his or her list 34 for the purpose of navigation to that particular destination for further interaction. Application 33 already has each password and user name listed for each URL. It is not necessary, however, that the password and user name be displayed for a user or users. These may well be stored transparently in a user's profile, and invoked as needed as a user makes selections. Therefore, a user is spared the need of entering passwords and user names for any destinations enabled by list 34. Of course, each list 34 is built, configured and maintained by a subscribing user or users, and an editing facility is also provided wherein a user may edit and update listings, including changing URL's adding and deleting listings, and the like.

In another aspect of the invention new listings for a user's profile, such as a new passthrough to a bank or other enterprise page, may be added semi-automatically as follows: Typically, when a user opens a new account with an enterprise through interaction with a WEB page hosted by the enterprise, the user is required to provide certain information, which will typically include such as the user's ID, address, e-mail account, and so forth, and typically a new user name and password to access the account. In this process the user will be interacting with the enterprise's page from his/her browser. A Password-All plug-in is provided wherein, after entering the required information for the new enterprise, the user may activate a pre-determined signal (right click, key stroke, etc.), and the Password-All suite will then enter a new passthrough in the user's Password. All profile at the Password-All Portal server.

In a related method for new entries, the enterprise hosting the Password-All Portal may, by agreement with other enterprises, provide log-in and sign-up services at the Password-All Portal, with most action transparent to the user. For example, there may be, at the Password-All Portal, a selectable browser list of cooperating enterprises, such as banks, security services, and the like, and a user having a Password-All Portal subscription and profile may select among such cooperating enterprises and open new accounts, which will simultaneously and automatically be added to the Password-All Portal page for the user and to the server hosted by the cooperating enterprise. There may be some interactivity required for different accounts, but in the main, much information from the user's profile may be used directly without being re-entered.

The inventors have anticipated that many potential users may well be suspicious of providing passwords and user names to an enterprise hosting a Password-All Portal Server executing a service like Password-All according to embodiments of the present invention. To accommodate this problem, in preferred embodiments, it is not necessary that the user provide the cleartext password to Password.All. Instead, an encrypted version of each password is provided. When a user links to his passthrough page in Password-All at the Password-All Portal server, when he/she invokes a hyperlink, the encrypted password is returned to the user's system, which then, by virtue of the kept encryption key or master password, invokes the true and necessary password for connection to the selected destination. It is thus not necessary that cleartext passwords be stored at the Password-All Portal server, where they may be vulnerable to attack from outside sources, or to perceived misuse in other ways as well.

In a related safety measure, in a preferred embodiment of the invention, a user's complete profile is never stored on a single server, but is distributed over two or more, preferably more, servers, so any problem with any one server will minimize the overall effect for any particular user.

Password-All, as described above, allows a user to access a complete list of the user's usual cyberspace destinations, complete with necessary log-on data, stored in an encrypted fashion, so a user may simply select a destination (a hyperlink) in the Password-All list, and the user's browser then invokes the URL for the selected destination. In an added feature, Password-All may display banner ads and other types of advertisement during the navigation time between a hyperlink being invoked and the time the destination WEB page is displayed.

In yet another embodiment of the invention, a user/subscriber need not access the Password-All page to enjoy the advantages of the unique features provided. In this variation, a Plug-In is provided for the subscriber's WEB browser. If the subscriber navigates by use of the local browser to a WEB page requiring a secure log-in, such as his/her on-line banking destination, when the subscriber is presented with an input window for ID and Password, the plug in may be activated by a predetermined user input, such as a hot key or right click of the mouse device. The plug-in then accesses, transparently, the Password-All page (which may be cached at the client), and automatically accesses and provides the needed data for log-on.

In yet another aspect of the invention a search option 37 allows a user to search list 34 for specific URL's based on typed input such as keywords or the like. In some cases, the number of URL's stored in list 34 can be extensive making a search function such as function 37 an attractive option. A criteria dialog box 51 illustrated as logically separated from and below list 34 is provided and adapted to accept input for search option 37 as is known in the art. In one embodiment, search option 37 may bring up a second window wherein a dialog box such as box 51 could be located.

In another aspect of the invention the search function may also be configured in a window invoked from window 33, and caused to search all or selected ones of listed destinations, and to return results in a manner that may be, at least to some extent, configured by a user. For example, a dialog box may be presented wherein a user may enter a search criteria, and select among all of the listed destinations. The search will then be access each of the selected destinations in turn, and the result may be presented to the user as each instance of the criteria is found, or results may be listed in a manner to be accessed after the search.

Preferably the search function is a part of the Password-All Portal software, available for all users, and may be accessed by hyperlinks in user's personal pages. In some embodiments users may create highly individualized search functions that may be stored in a manner to be usable only by the user who creates such a function.

In many aspects of the present invention, knowledge of specific WEB pages, and certain types of WEB pages, is highly desirable. In many embodiments characteristics of destination WEB pages are researched by persons (facilitators) maintaining and enhancing Password-All Portal software 35, and many characteristics may be provided in configuration modules for users to accomplish specific tasks. In most cases these characteristics are invoked and incorporated transparent to the user.

In yet another aspect of the present invention, the Password-All suite is structured to provide periodic reports to a user, in a manner to be structured and timed by the user, through the user's profile. For example, reports of changes in account balances in bank accounts, stock purchases, stock values, total airline travel purchases, frequent-flier miles, and the like may be summarized and provided to the users in many different ways. Because the Password-All Portal server with the Password-All software site handles a broad variety of transactional traffic for a user, there is an opportunity to summarize and collect and process statistics in many useful ways. In preferred embodiments of the invention such reports may be furnished and implemented in a number of different ways, including being displayed on the user's secure personal WEB page on the Password-All Portal.

In addition to the ability of performing tasks as described above, task results including reports, and hard documents such as airline tickets may be sent over the Internet or other data packet-networks to user-defined destinations such as fax machines, connected computer nodes, e-mail servers, and other Internet-connected appliances. All tasks may be set-up and caused to run according to user-defined schedules while the user is doing something else or is otherwise not engaged with the scheduled task.

In another embodiment of the present invention, recognizing the increasing use of the Internet for fiscal transactions, such as purchasing goods and services, a facility is provided in a user's profile to automatically track transactions made at various destinations, and to authorize payment either on a transaction-by-transaction basis, or after a session, using access to the user's bank accounts, all of which may be pre-programmed and authorized by the user.

Other functions or options illustrated as part of application 35 include a last URL option 41, an update function 43, and an add function 45. Function 41 allows a user to immediately navigate to a last visited URL. Update function 43 provides a means of updating URL's for content and new address. An add function enables a user to add additional URL's to list 34. Similarly, function 45 may also provide a means to delete entries. Other ways to add accounts are described above. It should be noted that the services provided by the unique Password-All Portal in embodiments of the present invention, and by the Password-All software suite are not limited to destinations requiring passwords and user names. The Password-All Portal and software in many embodiments may also be used to manage all of a user's bookmarks, including editing of bookmarks and the like. In this aspect, bookmarks will typically be presented in indexed, grouped, and hierarchical ways.

There are editing features provided with Password-All for adding, acquiring, deleting, and otherwise managing bookmarks. As a convenience, in many embodiments of the invention, bookmarks may be downloaded from a user's Password-All site, and loaded onto the same user's local browser. In this manner, additions and improvements in the bookmark set for a user may be used without the necessity of going to Password-All. Further, bookmarks may be uploaded from a user's local PC to his/her home page on the Password-All site by use of one or more Password-All plug-ins.

It will be apparent to the skilled artisan, given the teaching herein, that the functionality provided in various embodiments of the invention is especially applicable to Internet-capable appliances that may be limited in input capability. For example, a set-top box in a WEB TV application may well be without a keyboard for entering IDs and Passwords and the like. In practice of the present invention keyboard entry is minimized or eliminated. The same comments apply to many other sorts of Internet appliances.

In preferred embodiments of the invention, once a subscriber-user is in Password-All, only an ability to point-and-click is needed for all navigation. To get into the Password-All site, using a limited apparatus, such as an appliance without a keyboard or keypad, a Smartcard or embedded password may be used, or some other type of authentication.

It will be apparent to one with skill in the art that an interactive application such as application 33 may be provided in a form other than a WEB page without departing from the spirit and scope of the present invention. For example, an application such as application 33 may be provided as a downloadable module or program that may be set-up and configured off-line and made operational when on-line.

Figure 3:
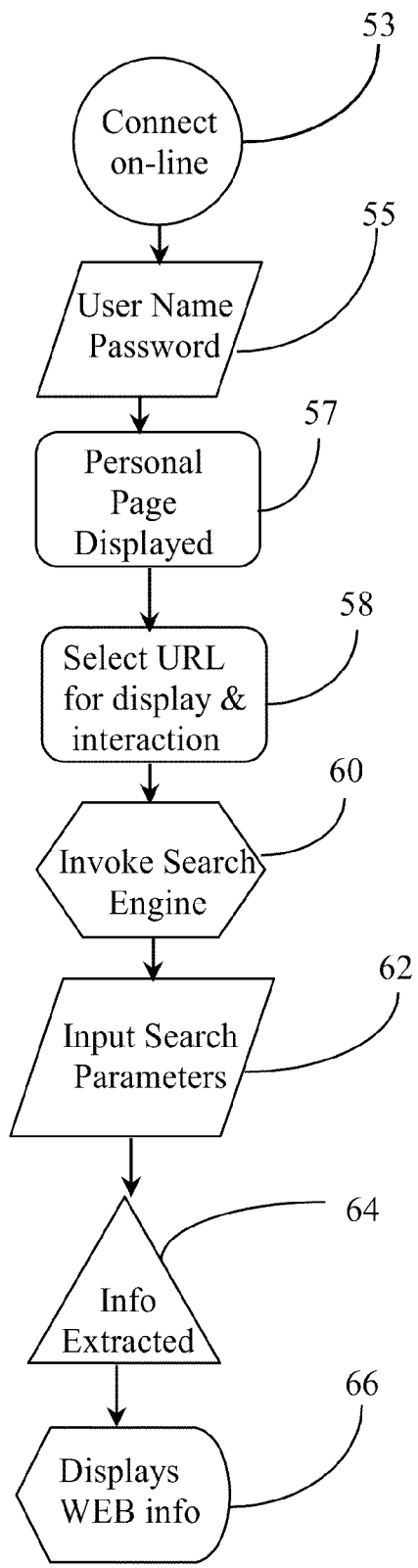
FIG. 3 is a flow diagram illustrating user interaction with the Internet portal of FIG. 1.

FIG. 3 is a flow diagram illustrating user interaction with the Internet Password-All Portal of FIG. 1. The following process steps illustrated, according to an embodiment of the present invention, are intended to illustrate exemplary user-steps and automated software processes that may be initiated and invoked during interaction with an Internet portal of the present invention such as portal 31 of FIG. 1. In step 53 a user connects to the Internet or another previously described switched-packet network via a compatible appliance such as Internet appliance 17 of FIG. 1.

At step 55, a user enters a user-name and password, which, in one embodiment, may simply be his ISP user name and password. In another embodiment, a second password or code would be required to access an Internet portal such as portal server 31 of FIG. 1 after logging onto the Internet through the ISP. In some cases, having a special arrangement with the ISP, there may be one password for both Internet access through the ISP and for Password-All. At step 57 a personal WEB page such as page 32 of FIG. 2 is displayed via Internet portal server 31. At minimum, the personalized WEB page will contain all user configured URL's, and may also be enhanced by a search function, among other possibilities.

In step 58 a user will, minimally, select a URL from his or her bookmarked destinations, and as is known by hyperlink technology, the transparent URL will be invoked, and the user will navigate to that destination for the purpose of normal user interaction. In this action, the Password-All Portal software transparently logs the user on to the destination page, if such log-on is needed.

At step 60 the user invokes a search engine by clicking on an option such as described option 37 of FIG. 2. At step 62, the user inputs search parameters into a provided text field such as text field 51 of FIG. 2. After inputting such parameters, the user starts the search by a button such as button 52. The search engine extracts information in step 64. Such information may be, in one option, of the form of URL's fitting the description provided by search parameters. A searched list of URL's may be presented in a separate generated page in step 66 after which a user may select which URL to navigate to. In an optional search function, the user may provide search criteria, and search any or all of the possible destinations for the criteria.

In another embodiment wherein WEB pages are cached in their presentable form, information extracted in step 64 may include any information contained in any of the stored pages such as text, pictures, interactive content, or the like. In this case, one displayed result page may provide generated links to search results that include the URL associated with the results. Perhaps by clicking on a text or graphic result, the associated WEB page will be displayed for the user with the result highlighted and in view with regards to the display window.

Enhanced Agent for Web Summaries

In another aspect of the present invention, a software agent, termed a gatherer by the inventors, is adapted to gather and return summary information about URL's according to user request or enterprise discretion. This is accomplished in embodiments of the present invention by a unique scripting and language parsing method provided by the inventor wherein human knowledge workers associated with the service provide written scripts to such a gatherer according to subscriber or enterprise directives. Such a software gatherer, and capabilities thereof, is described in enabling detail below.

Referring now to FIG. 1, there is illustrated an exemplary architecture representing a portal service-network which, in this case is hosted by ISP 15. Portal software 35 in this embodiment executes on portal server 31 set-up at the ISP location. Mass repository 29 is used for storing subscriber information such as passwords, login names, and the like. Internet servers 23, 25, and 27 represent servers that are adapted to serve WEB pages of enterprises patronized by a subscriber to the portal service such as one operating Internet appliance 17.

The main purpose of portal software 35 as described above with reference to FIG. 2, is to provide an interactive application that lists all of the subscriber's WEB sites in the form of hyperlinks. When a user invokes a hyperlink from his personal list, software 35 uses the subscriber's personal information to provide an automatic and transparent login function for the subscriber while jumping the subscriber to the subject destination.

Referring again to FIG. 2, an interactive list 34 containing user-entered hyperlinks and a set of interactive tools is displayed to a subscriber by portal software 35 of FIG. 1. One of the tools available to a subscriber interacting with list 34 is agent (software) 39. Agent 39 may be programmed to perform certain tasks such as obtaining account information, executing simple transactions, returning user-requested notification information about upcoming events, and so on. Search function 37 and update function 43 may be integrated with agent 39 as required to aid in functionality.

It is described in the above disclosure that agent 39 may, in some embodiments, search for and return certain summary information contained on user-subscribed WEB pages, such as account summaries, order tracking information and certain other information according to user-defined parameters. This feature may be programmed by a user to work on a periodic time schedule, or on demand.

In the following disclosure, enhancements are provided to agent 39. Such enhancements, described in detail below, may be integrated into agent 39 of portal software 35 (FIGS. 1 and 2); and may be provided as a separate agent or gatherer to run with portal software 35; or may, in some embodiments, be provided as a standalone service that is separate from portal software 35.

Figure 4:
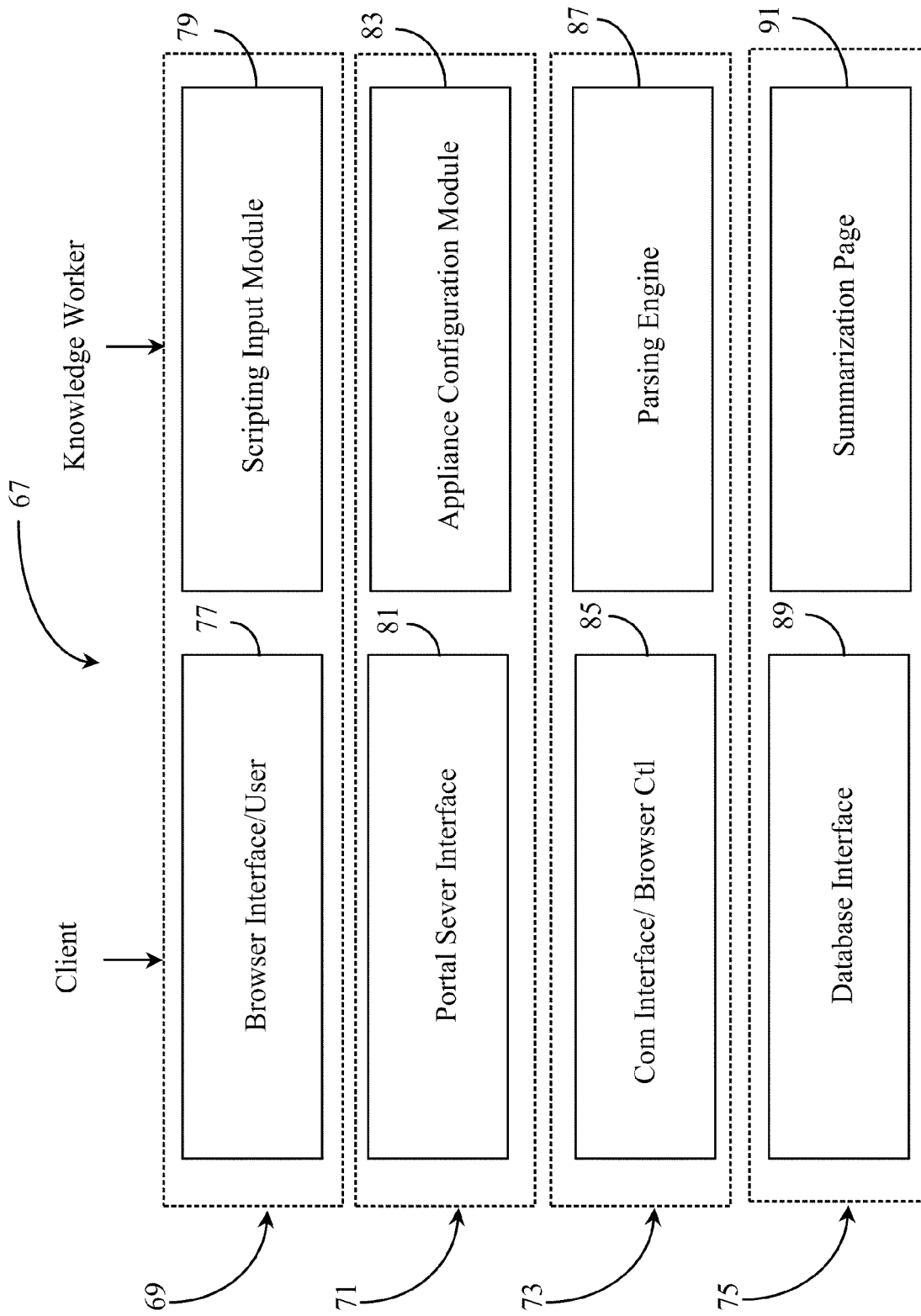
FIG. 4 is a block diagram illustrating a summarization software agent and capabilities thereof according to an embodiment of the present invention.

FIG. 4 is a block diagram illustrating a summarization software agent 67 and various capabilities and layers thereof according to an embodiment of the present invention. Summarization agent 67, hereinafter termed gatherer 67, is a programmable and interactive software application adapted to run on a network server. Gatherer 67 may, in one embodiment, be integrated with portal software 35 of FIG. 1 and be provided in the form of a software module separate from agent 39 (FIG. 2). In another embodiment, gatherer 67 may be a part of agent 39 as an enhancement to the function of that agent as previously described. In still another embodiment, gatherer 67 may be provided as a parent or client-side application controlled by a separate service from the portal service described above.

In this exemplary embodiment gatherer 67 is a multi-featured software application having a variety of sub-modules and interface modules incorporated therein to provide enhanced function. Gatherer 67 has a client/service interface layer 69 adapted to enable directive input from both a client (user) and a knowledge worker or workers associated with the service. A browser interface 77 is provided in layer 69, and adapted to provide access to application 67 from a browser running on a client's PC or other Internet or network appliance. Interface 77 facilitates bi-directional communication with a user's browser application (not shown) for the purpose of allowing the user to input summary requests into gatherer 67 and receive summary results. Interface 77 supports all existing network communication protocols such as may be known in the art, and may be adapted to support future protocols.

Layer 69 also comprises a unique input scripting module 79 that is adapted to allow a human knowledge worker to create and supply directive scripts containing the site logic needed by gatherer 67 to find and retrieve data from a WEB site. In this case, gatherer 67 executes and runs on a network server such as server 31 of FIG. 1. However, this is not required in order to practice the present invention.

It is assumed in this example that gatherer 67 is part of the portal software suite 35 running on server 31 of FIG. 1. Gatherer 67 may be provided as several dedicated agents, or as one multi-functional agent without departing from the spirit and scope of the present invention. For example, one gatherer 67 may be scripted and programmed to execute a single user request with additional gatherers 67 called upon to perform additional user-requests. Alternatively, one gatherer 67 may be dedicated and assigned to each individual user and adapted to handle all requests from that user.

Interface layer 69 facilitates exchange of information from both a client and a knowledge worker. A client operating a WEB browser with an appropriate plug-in is enabled to communicate and interact with gatherer 67. For example, a user may enter a request to return a summary of pricing for all apartments renting for under $1000.00 per month located in a given area (defined by the user) from apartments.com (one of user's registered WEB sites). The just mentioned request would be categorized as either a periodic request, or a one time (on demand) request. The communicated request initiates a service action wherein a knowledge worker associated with the service uses module 79 to set-up gatherer 67 to perform it's function. Module 79 is typically executed from a network-connected PC operated by the knowledge worker.

According to an embodiment of the present invention, a unique scripting method facilitated by module 79 is provided to enable gatherer 67 to obtain the goal information requested by a user. For example, the above mentioned example of WEB-site apartments.com has a specific HTML (hyper-text-markup-language) logic that it uses to create its site and post its information. Such site logic is relatively standard fare for a majority of different sites hosted by different entities. Using this knowledge, a knowledge worker creates a site-specific script or template for gatherer 67 to follow. Such a template contains descriptions and locations of the appropriate fields used, for example, at apartments.com. Apartment description, location, deposit information, rental information, agent contact information, and other related fields are matched in terms of location and label description on the template created with module 79. Completed templates are stored in a database contained in a storage facility such as, perhaps, repository 29 of FIG. 1. Such templates may be reused and may be updated (edited) with new data.

In one embodiment, one script may contain site logics for a plurality of WEB pages, and instructions for specific navigational instruction and password or login information may be contained therein and executed serially, such as one site at a time. It is important to note that the knowledge worker or workers may perform much of their scripting via automatic controls such as by object linking and embedding (OLE) and a minor portion of scripting may be performed manually in an appropriate computer language, many of which are known in the art).

Gatherer 67 also has a process layer 71 adapted for internal information gathering and parameter configuration. An optional portal server interface 81 is provided and adapted to allow gather 67 to provide updated information to a user's list of hyperlinks and also to obtain data from portal server 31 if required. For example, required hyperlinks may be mirrored from a user's home page to a scripting template for navigational purposes. In an embodiment wherein gatherer 67 is part of a standalone service, a convention for providing user login information may be supplied at the client's end when a request is made. For example, an encrypted password may be supplied by a client plug-in and gatherer 67 may temporarily borrow the user's encryption key when auto login is performed.

An appliance configuration module 83 is provided and adapted to allow a user to define and configure an Internet appliance to communicate with the service and receive summary information. Such appliances may include but are not limited to palm top PC's, lap top PC's, cellular telephones, WEB TV's, and so on. Typically, a user will be presented a configuration WEB page from a network server that displays in his browser window on his desktop PC. The page contains an interface for communicating device parameters and communication protocol types to module 83. In this way, a user may configure a preferred device for receipt of summary information. Device parameters and communication protocols inherent to such a device are incorporated into the scripting of the site template and are used as instructions for WEB summary delivery.

A navigation layer 73 is provided and adapted to perform the function of external site navigation and data gathering for gatherer 67. To this end, a communication interface/browser control module 85 is provided and adapted to function as a WEB browser to access WEB sites containing WEB data. Control 85 receives it's instruction from the scripted template created by the knowledge worker.

A parsing engine 87 is provided and adapted to parse individual WEB sites according to a template created via scripting module 79. Parsing engine 87 may be a Pearl engine, an IE HTML engine, or any other or combination of known parsing engines. The template (not shown) tells control 85 and parsing engine 87 where to go and what fields at the destination site to look for to access desired data. Once the data fields are located, parsing engine 87 gathers current data in the appropriate field, and returns that data to the service for further processing such as data conversion, compression and storage, and the like.

Because WEB sites use tools that use consistent logic in setting up their sites, this logic may be used by the summarization service to instruct control 83 and parsing engine 87. The inventor provides herein an exemplary script logic for navigating to and garnishing data from Amazon™.com. The hyperlinks and/or actual URLs required for navigation are not shown, but may be assumed to be included in the template script. In this example, a company name Yodlee (known to the inventors) is used in the script for naming object holders and object containers, which are in this case Active X™ conventions. In another embodiment, Java™ script or another object linking control may be used. The scripted template logic example is as follows:

```
# Site amazon.orders.x - shows status of orders from Amazon
login( 7 );
get( "/exec/obidos/order-list/" );
my @tables = get_tables_containing_text( "Orders:" );
my $order_list = new Yodlee::ObjectHolder( 'orders' );
$order_list->source( 'amazon' );
$order_list->link_info( get_link_info( ) );
my @href_list;
my @container_list;
foreach my $table ( @tables ) {
        my @rows = get_table_rows( );
foreach my $i ( 0 .. $#rows ) {
        select_row( $i );
        my $text = get_text( $rows[ $i ] );
        next if $text =~ /Orders:|Status/;
        my @items = get_row_items( );
        next unless @items >= 4;
        my( $order_num, $date, $status );
        select_cell( 1 );
        $order_num = get_cell_text( );
        my $href = get_url_of_first_href( get_cell( ) );
        select_cell( 2 );
        $date = get_cell_text( );
        select_cell( 3 );
        $status = get_cell_text( );
        next unless defined $order_num and defined $date and
        defined $status;
        my $order = new Yodlee::Container( 'orders' );
        $order->order_number( $order_num );
        $order->date( $date );
        $order->status( $status );
        $order_list->push_object( $order );
        if( defined $href) {
            push( @href_list, $href);
            push( @container_list, $order );
foreach my $i ( 0 .. $#href_list ) {
        get( $href_list[ $i ] );
        @tables = get_tables_containing_text( "Items
        Ordered:" );
foreach my $table ( @tables ) {
        my @rows = get_table_rows( );
foreach my $j ( 0 .. $#rows ) {
        select_row( $j );
        my $href = get_url_of_first_href( get_row( ) );
        next unless defined $href;
        my @child_list = get_children( get_row( ), 'a' );
        next unless defined $child_list[ 0 ];
        my $text = get_text( $child_list[ 0 ] );
        $container_list[ $i ]->description( $text );
    }
  }
}
result( $order_list );
```

The above example is a script that instructs control 85 and parser 87 to navigate to and obtain data from Amazon™.com, specifically that data that reflects the user's current order status. Scripts may also be written to obtain virtually any type of text information available from any site. For example, a user may wish to obtain the New York Times headlines, the top ten performing stocks, a comparative list of flights from San Francisco to New York, etc. In one embodiment, metadata may be associated with and used in-place of the actual scripted language for the purpose of reducing complication in the case of many scripts on one template.

A data processing layer 75 is provided and adapted to store, process, and present returned data to users according to enterprise rules and client direction. A database interface module 89 is provided and adapted to provide access for gatherer 67 to a mass repository such as repository 29 of FIG. 1, for the purpose of storing and retrieving summary data, templates, presentation directives, and so on. Gatherer agent 67 may also access data through interface 89 such as profile information, user account and URL information, stored site logics and so on. Data scanned from the WEB is stored in a canonical format in a database such as repository 29, or in another connected storage facility. All stored data is, of course, associated with an individual who requested it, or for whom the data is made available according to enterprise discretion.

A summarization page module 91 is provided and adapted to organize and serve a WEB summary page to a user. Module 91, in some embodiments, may immediately push a WEB summary to a user, or module 91 may store such summarized pages for a user to access via a pull method, in which case a notification may be sent to the user alerting him of the summary page availability. Summarization module 91 includes an HTML renderer that is able to format data into HTML format for WEB page display. In this way, e-mail messages and the like may be presented as HTML text on a user's summarization page. Moreover, any summary data from any site may include an embedded hyperlink to that site. In this way, a user looking at an e-mail text in HTML may click on it and launch the appropriate e-mail program. Other sites will, by default, be linked through the summary page.

Many users will access their summary data through a WEB page as described above, however, this is not required in order to practice the present invention. In some embodiments, users will want their summary information formatted and delivered to one of a variety of Internet-capable appliances such as a palm top or, perhaps a cell phone. To this end, the renderer is capable of formatting and presenting the summary data into a number of formats specific to alternative devices. Examples of different known formats include, but are not limited to XML, plain text, VoxML, HDML, audio, video, and so on.

In a preferred embodiment of the present invention, gather 67 is flexible in such a way as it may act according to enterprise rules, client directives, or a combination of the two. For example, if a user makes a request for summary data about a user/subscribed WEB page to be periodically executed and presented in the form of a HTML document, then gather 67 would automatically access and analyze the required internal information and user provided information to formulate a directive. Using scripting module 79, a knowledge worker provides a template (if one is not already created for that site) that contains the "where to go" and "what to get" information according to site logic, user input, and known information.

Alternatively, if a user requests a summary about data on one of his sites such as, perhaps, current interest rates and re-finance costs at his mortgage site, the service may at it's own discretion provide an additional unsolicited summary from an alternate mortgage site for comparison. This type of summarization would be designed to enhance a user's position based on his profile information. In this case, updated data about latest interest rates, stock performances, car prices, airline ticket discounts, and so on would be stored by the service for comparative purposes. If a user request for a summary can be equaled or bettered in terms of any advantage to the user, such summary data may be included.

In many cases, created templates may be re-used unless a WEB site changes it's site logic parameters, in which case, the new logic must be accessed and any existing templates must be updated, or a new template may be created for the site. The templates contain site-specific script obtained from the site and stored by the knowledge workers. In one embodiment, companies hosting WEB pages automatically provide their site logics and any logic updates to the service by virtue of an agreement between the service and the WEB hosts.

In an alternative embodiment gatherer 67 may be implemented as a client application installed on a user's PC. In this embodiment, a user would not be required to supply log-in or password codes. Summarization scripts may be sent to the client software and templates may be automatically created with the appropriate scripts using log-in and password information encrypted and stored locally on the user's machine.

In addition to providing WEB summary information, gatherer 67 may also be used to provide such as automatic registration to new sites, and for updating old registration information to existing sites. For example, if a user whishes to subscribe, or register at a new site, only the identification of the site is required from the user as long as his pertinate information has not changed. If a new password or the like is required, gatherer 67 through control module 73 may present login or password codes from a list of alternative codes provided by a user. In another embodiment, a database (not shown) containing a wealth of password options may be accessed by gatherer 67 for the purpose of trying different passwords until one is accepted by the site. Once a password or log-in code is accepted, it may be sent to a user and stored in his password list and at the network level.

It will be apparent to one with skill in the art that a software application such as gatherer 67 may be implemented in many separate locations connected in a data network. For example, a plurality of gatherer applications may be distributed over many separate servers linked to one or more mass repositories. Client applications include but are not limited to a WEB-browser plug-in for communicating to the service. Plug-in extensions may also be afforded to proxy servers so that auto-login and data access may still be performed transparent to a user.

In another embodiment, plug-ins enabling communication with gatherer 67 may be provided and configured to run on other network devices for the purpose of enabling such a device to initiate a request and get a response without the need for a desktop computer.

In most embodiments a user operating a desktop PC will order a one time or periodic summary related to some or all of his subscribed WEB sites. A logical flow of an exemplary request/response interaction is provided below.

Figure 5:
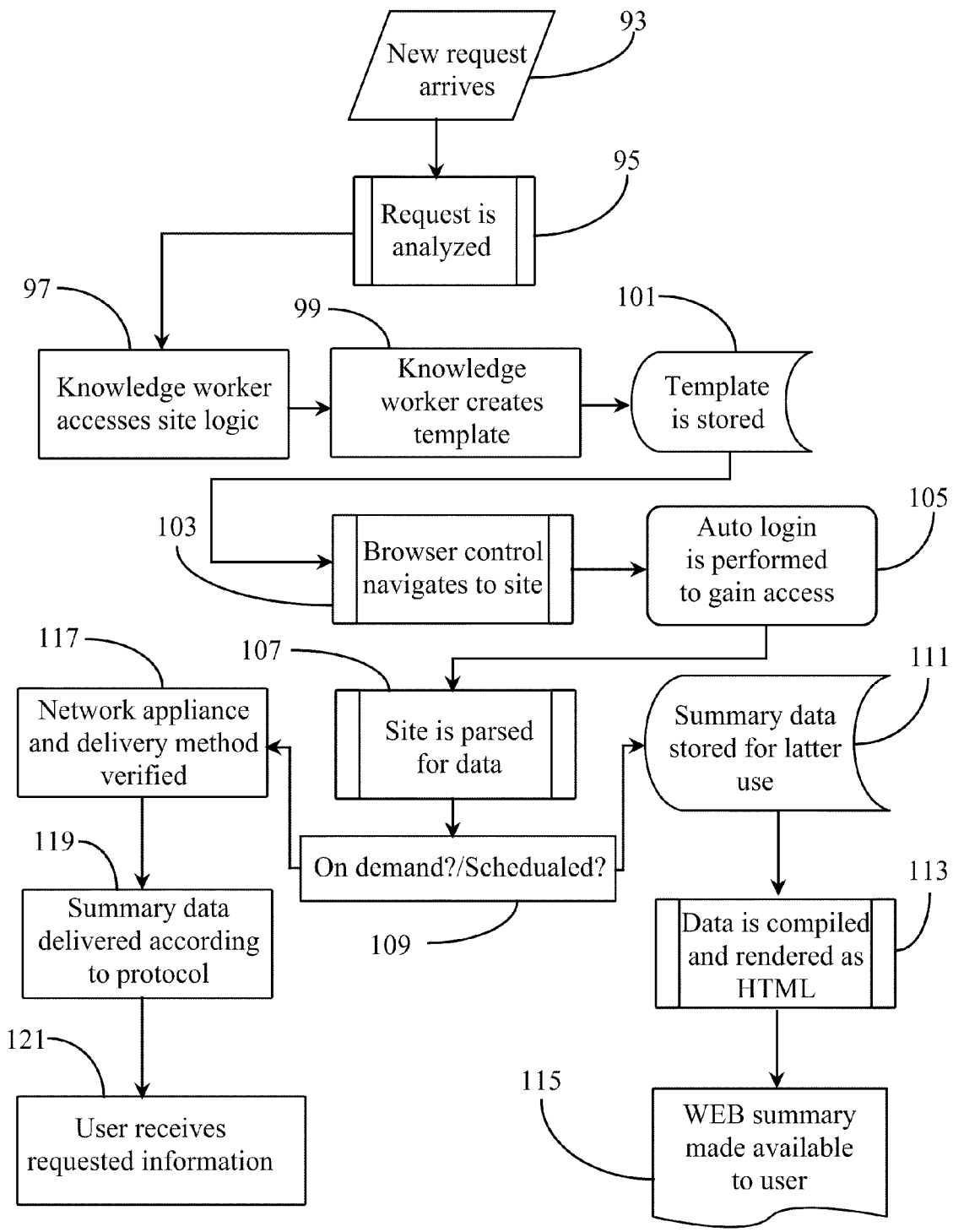
FIG. 5 is a logical flow chart illustrating an exemplary summarization process performed by the software agent of FIG. 4 operating in a user-defined mode.

FIG. 5 is a logical flow chart illustrating an exemplary summarization process performed by the software agent of FIG. 4 operating in a user-defined mode. In step 93, a user has initiated a new request for a summary (summary order). It is assumed for the purpose of discussion, that the request of step 93 involves a site wherein no template has been created. In step 95, the request is received and analyzed. A knowledge worker will likely perform this step. The new request may be posted to the user's portal home page, sent directly to gatherer 67, or even communicated through e-mail or other media to the service.

In step 97 a knowledge worker accesses particular site logic associated with the request URLs. For example, if the request involves a plurality of URLs, then all site logics for those URLs are accessed. Logic may be available in a repository such as repository 29 of FIG. 1 if they were obtained at the time of user registration to a particular URL, or sent in by WEB-site hosts shortly after registration. If it is a completely new URL, then the logic must be obtained from the site. In most cases however, the logic will be known by virtue of a plurality of users accessing common URLs. Therefore cross-linking in a database of logic/user associations may be performed to access a logic for a site that is new to one particular user, but not new to another.

In step 99, the knowledge worker creates a template by virtue of scripting module 79 (FIG. 4) containing all site logic, URLs, log-in and password information, and the user request information. As described previously, templates may be re-used for a same request. In most cases, scripting may be mostly automated with minimum manual input performed by the knowledge worker. In many cases, an existing template will match a new request exactly, and may be re-used. In that case steps 97, 99, and 101 would not be required.

In step 101 the template is stored and associated with the requesting user. The stored template may now be retrieved at a scheduled time for performing the summary gathering. At step 103, a browser control such as module 85 of FIG. 4 is activated to access the stored template and navigate to specified URLs for the purpose of gathering summary data. If a timing function is attributed to the template stored in step 101, then the template may self execute and call up the browser function. In another embodiment, the knowledge worker may notify the browser control to get the template for it's next task. In some embodiments, a plurality of controls may be used with one template as previously described.

In step 105, automatic log-in is performed, if required, to gain access to each specified URL. In step 107, a specified WEB-page is navigated to and parsed for requested data according to the logic on the template. If there are a plurality of WEB-pages to parse, then this step is repeated for the number of pages. A variety of parsing engines may be used for this process such as an IE™ parser, or a Pearl™ parser. Only the requested data is kept in step 107.

A request may be an on-demand request requiring immediate return, or a scheduled request wherein data may be posted. At step 109, such logic is confirmed. If the data is to be presented according to a periodic schedule, then summary data parsed in step 107 is stored for latter use in step 111. In step 113, the summary data is rendered as HTML if not already formatted, and displayed in the form of a summary WEB-page in step 115. The summary page may be posted for access by a user at a time convenient to the user (pull), or may be pushed as a WEB-page to the user and be made to automatically display on the user's PC. Notification of summary page availability may also be sent to a user to alert him of completion of order.

If the summary data is from a one-time on-demand request and required immediately by a user, then a network appliance and data delivery method (configured by the user) is confirmed, and the data is rendered in the appropriate format for delivery and display in step 117. In step 119, the summary data is delivered according to protocol to a user's designated appliance. In step 121 a user receives requested information in the appropriate format.

It will be apparent to one with skill in the art that there may be more or fewer logical steps as well as added sub-steps than are illustrated in this example. For example, step 105 may in other embodiments include sub-steps such as getting an encryption key from a user. In still another embodiment, part of a request may be rendered as HTML as in step 113 while certain other portions of the same request data might be rendered in another format and delivered via alternative methods. There are many possibilities.

The method and apparatus of the present invention may be used to present summaries to users without user input. Process logic such as this is detailed below.

Figure 6:
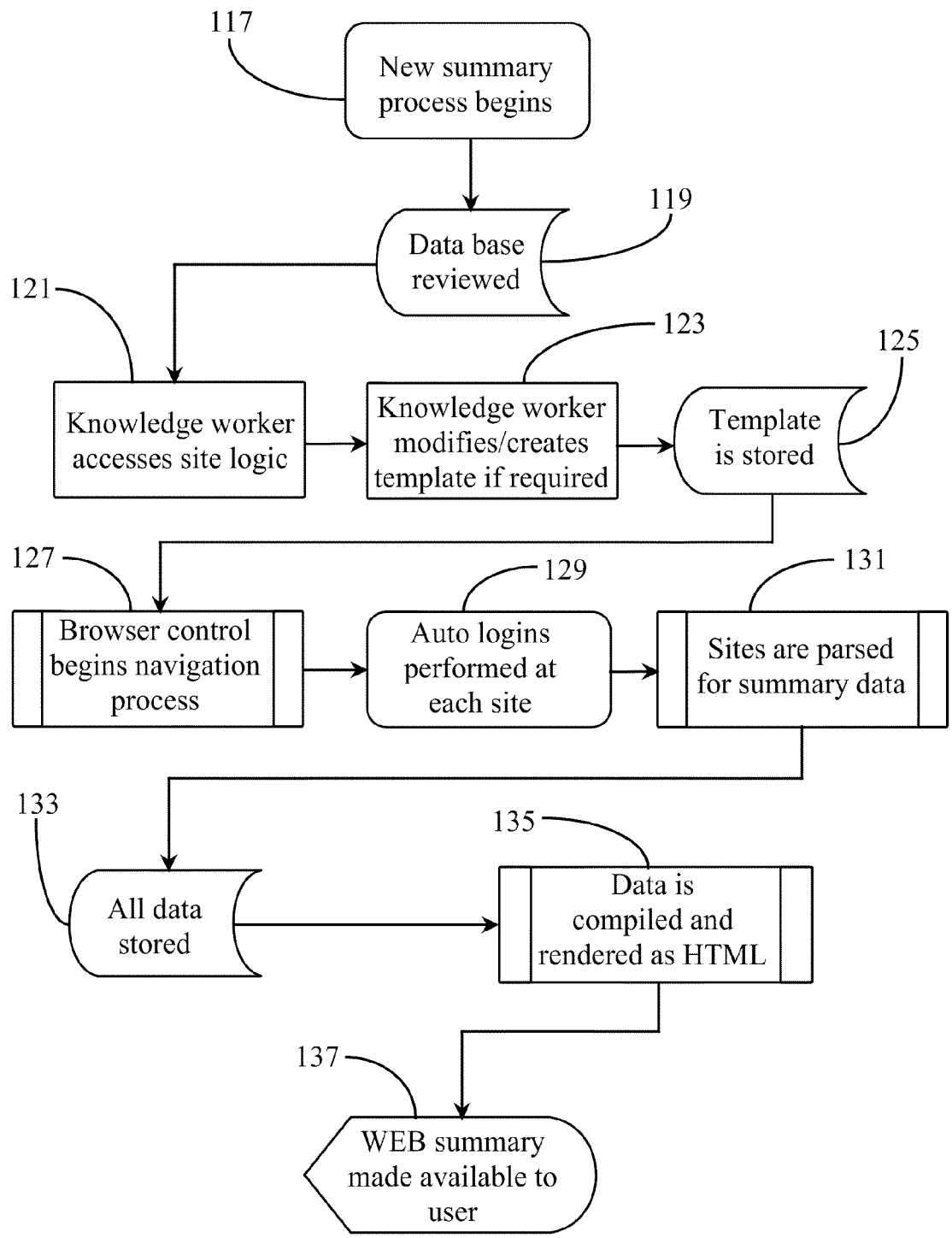
FIG. 6 is a logical flow chart illustrating an exemplary summarization process performed by the software agent of FIG. 4 in a User-independent smart mode with minimum user input.

FIG. 6 is a logical flow chart illustrating an exemplary summarization process performed by the software agent of FIG. 4 in a User-independent smart mode with minimum or no user input. In step 117 an enterprise-initiated summary process begins. In this case, the enterprise may be assisting a user in finding a better deal or, perhaps presenting the individual with summaries from and links to alternative pages not yet subscribed to by a user.

In step 119, a database containing user information and parameters is accessed and reviewed. Certain information specific to a user may be required to initiate an enterprise-sponsored summary report. At step 121, the knowledge worker accesses the site logic specific to the specified target site or sites for summarization. In step 123, the knowledge worker modifies an existing user template, or creates a new one if necessary. At step 125 the template is stored in a repository such as repository 29 and associated with the user.

As described in FIG. 5, the template either self-executes according to a timed function and invokes a browser control such as control 85 (FIG. 4), or is accessed by control 85 as a result of task notification. In step 127, the browser control begins navigation. Auto logins are performed, if required, in step 129 to gain access to selected sites. If the WEB pages are new to a user, and the user has no registration with the WEB site, then through agreement, or other convention, the service may be provided access to such sites. Such an agreement may be made, for example, if the host of the WEB site realizes a possibility of gaining a new customer if the customer likes the summary information presented. In many other situations, no password or login information is required to obtain general information that is not personal to a client.

In step 131, all sites are parsed for summary data and stored in canonical fashion in step 133. At step 135, the data is compiled and rendered as HTML for presentation on a summary page. In step 137, a WEB summary containing all of the data is made available to a user and the user is notified of it's existence.

Providing certain information not requested by a user may aid in enhancing a user's organization of is current business on the WEB. Moreover, unsolicited WEB summaries may provide better opportunities than the current options in the user's profile. Of course, assisting a user in this manner will require that the enterprise (service) have access to the user's profile and existing account and service information with various WEB sites on the user's list. A user may forbid use of a user's personal information, in which case, no enterprise-initiated summaries would be performed unless they are conducted strictly in an offer mode instead of a comparative mode.

The method and apparatus also may be practiced in a language and platform independent manner, and be implemented over a variety of scalable server architectures.

Presenting Meta-Summarized Reports

In another aspect of the present invention, a method is provided largely through unique software wherein summary reports may be ordered and presented to users, the reports reflecting calculated and solution-orientated results. This type of summarizing is termed meta-summarization by the inventors, because it is a summarization over a plurality of data sources. Such a method is described in enabling detail below.

Figure 7:
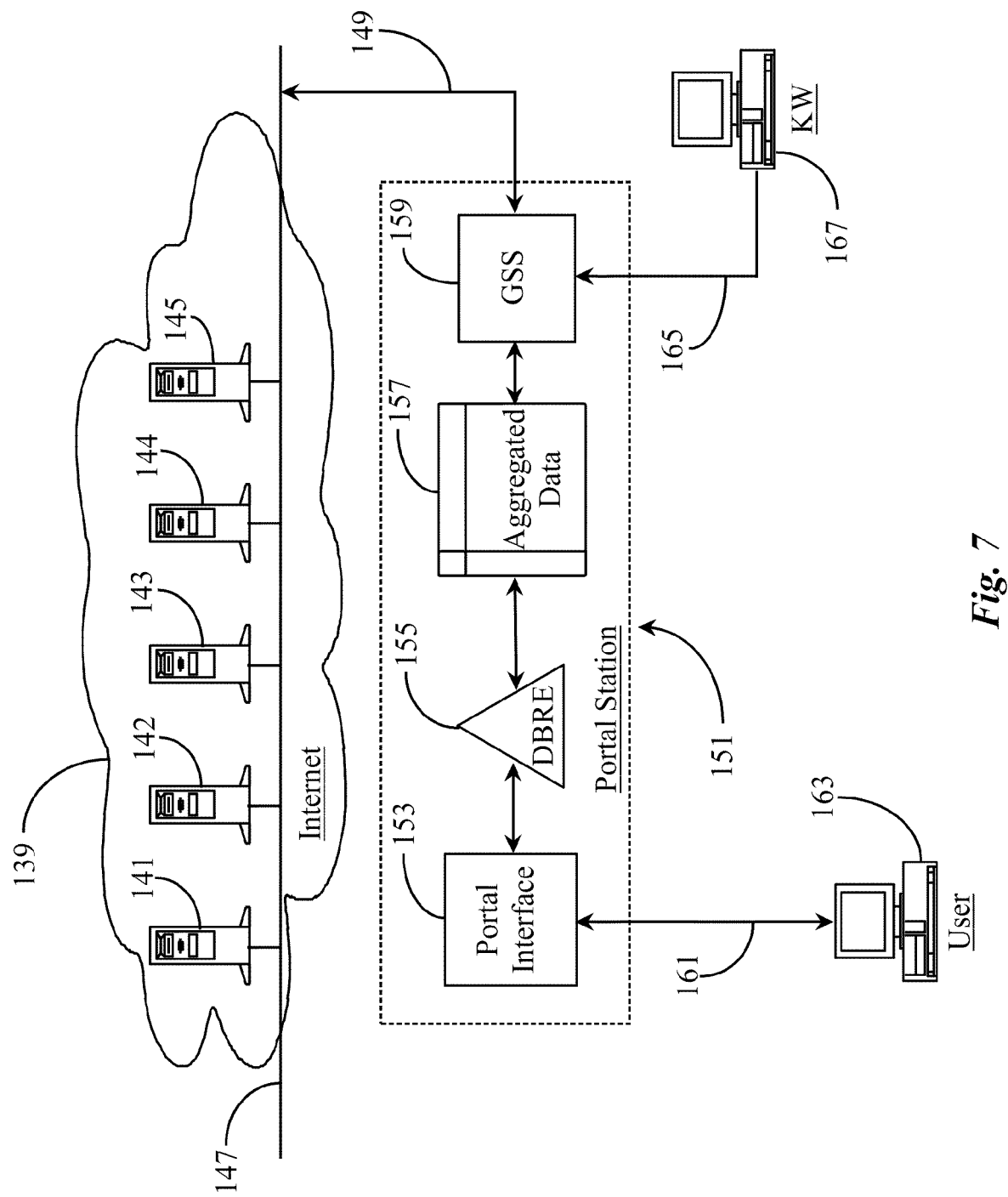
FIG. 7 is an overview of a meta-summarization process according to an embodiment of the present invention.

FIG. 7 is an overview of a meta-summarization process according to an embodiment of the present invention. The term "meta-summary" is used by the inventor in this embodiment also to distinguish the meta-summary process taught herein from the summary process taught above in this specification; in that meta-summarizing involves interpreting and calculating data for reporting a solution-orientated result derived from data retrieved from multiple network sources.

In this embodiment, a portal station 151 is provided and adapted by virtue of software and hardware, to perform WEB-summary and presentation services according to embodiments described in the co-patent applications listed above. Station 151 may be an ISP, a main Internet server, or other network connected server or interface station. In this example, portal station 151 is continuously connected to a source network, which is in this embodiment, the Internet network represented by Internet cloud 139. The above-described network connection is afforded by an Internet-connection line 149 from station 151 to an Internet backbone 147. Internet backbone 147 represents all lines and connections, including sub-nets that make up a global Internet 139.

Portal station 151 has a means provided therein for maintaining a portal interface 153. Portal interface 153 is a file-server interface in this example, however in other embodiments, differing types of network-interface hardware may be substituted therefor. Interface 153 provides hyper-text-transfer protocol (HTTP) pages over an Internet-connection such as path 161 to subscribing users operating such as an illustrated network-adapted PC 163. A user operating PC 163 may go on-line, in this case by such as a dial-up connection, and communicate with portal interface 153 over connection path 161. Connection path 161 may be a normal telephone line, an ISDN line, or another known type of Internet-connection link including wireless connection. A dial-up connection is illustrated herein only as a more common connection method.

A data repository 157 is provided within station 151 and adapted to warehouse aggregated data on behalf of and about a user. Data repository 157 may be part of the same hardware supporting portal interface 153 or it may be a separate hardware implementation connected by a data link. Repository 157 may be of the form of optical storage, or any other known implementation used for storing large amounts of digital data. Repository 157 may be assumed to support varied database programs as may be required to manipulate and organize data or metadata stored therein.

A data gathering sub-system GSS 159 is provided within station 151 and is adapted as a software and hardware implementation capable of navigating data-packet networks, such as Internet 139, upon instruction. GSS 159 represents automated browser control/navigation as described in co-pending patent application Ser. No. 09/523,598. GSS 159 is analogous to navigation layer 73 described in FIG. 4 above.

A plurality of network-connected data sources represented herein by file/data servers 141-145 are illustrated in Internet 139. Servers 141-145 are user-subscribed servers known to portal station 151. For example, servers 141-145 may represent one user's collective WEB-services for banking and investment. Such options include banking, stock trading, retirement account servers, insurance servers, and so on. It is noted here that servers 141-145 are assumed to represent separate WEB-based services subscribed to by one user and are not affiliated with one another. For example, a user operating such as PC 163 would do all of his on-line banking, trading, and investing using servers 141-145 in this example.

In another embodiment, servers 141-145 may represent all of a user's frequented on-line shopping services. The fact that all of servers 141-145 are topically related but not affiliated with one another in this example serves only to aid in explanation of the present invention as will be seen below.

It is taught in the co-pending patent application entitled "Method and Apparatus for Obtaining and Presenting WEB Summaries to Users" that site navigation, parsing data, and returning data to users or storage is enabled, in part, by site-logic templates provided typically by knowledge workers. This aspect is represented herein by a PC 167 adapted for a knowledge worker (KW). A KW working from a station such as PC 167 provides site-logic scripts for navigation to data requested by a user and stored in any one of or all of servers 141-145. Such scripts are provided to GSS 159 over a data link 165. Summary data stored in such as repository 157 is stored for user access. In some cases wherein a user requests immediate data return, data is sent directly to such as portal interface 153 where a user may then access the data immediately.

According to an embodiment of the present invention, a novel database-reporting engine DBRE 155 is provided and adapted to perform formulative processes to aggregated data on behalf of a user. DBRE 155 is in itself a database utility and is in a preferred embodiment a part of the software environment of repository 157. In another embodiment DBRE 155 may be part of the software environment of portal interface 153.

In this embodiment, DBRE 155 acts as a first "gathering agent" and checks repository 157 first for user requested data upon request. User-history records of all user transactions at all of his registered WEB-based services are preferably maintained in repository 157 and are accessible to DBRE 155. In some cases, services such as those represented by servers 141-145 may provided complete transaction histories that may be obtained and stored in repository 157 and updated periodically. In some cases however, such services may not retain history records for users. In this case, a user accessing such services through his or her portal interface 153 may track each transaction over a normal course of time resulting in a history record for transactions at that service that is maintained in repository 157.

In the case of servers 141-145, each contains some form of financial portfolio data connected to one user. For example, server 141 may represent a banking service where a user has a savings account. Server 142 may represent a banking service where the user has a checking account. Server 143 may represent an on-line investment company maintaining a fast-changing portfolio of investments and losses for the particular user. Server 144 may represent a banking company where the user has an individual retirement account (IRA). Server 145 may represent a mortgage company holding data about the users property portfolios. Each site presumably holds current account-status information and a financial history of transactions performed by a particular user.

To illustrate, assume that all financial data particular to one user is provided by or obtained from servers 141-145, aggregated in data repository 157, and updated periodically. A user operating PC 163 may access portal interface 153 by way of Internet connection 161 and request a specific result that involves some or all of the data across multiple servers 141-145. One example would be a user-initiated command "calculate my current net-worth". The resulting meta-summarized report would inform a user of his or her calculated net-worth with all financial data from all financial datasources (servers 141-145) analyzed in the process of answering the user query.

In this case DBRE 155 utilizes only data that is already aggregated in repository 157. Therefore, it is not specifically required that GSS 159 navigate on behalf of the user in a case where data held in aggregation is current and sufficient to satisfy a user request. However, if a user's particular request, such as the one stated in the above example, requires navigation to one or more of servers 141-145, GSS 159, using site logic provided by KW 167, would navigate to each required site and retrieve the required data. After the required data is aggregated in repository 157, DBRE 155 may analyze the aggregated data and generate an accurate report from the aggregated data based on a user's request.

It will be apparent to one with skill in the art that providing a unique engine such as DBRE 155 on a user-side of repository 157 saves precious bandwidth resource required by individual site navigation and return of data ordered by a user. Added storage space is required in repository 157 for the purpose of storing complete activity histories from multiple WEB services on behalf of users. However, adding such resource and saving bandwidth represents an intelligent implementation in light of the many techniques known in the art for compressing and archiving data. More detail about the function of DBRE 155 is presented below.

Figure 8:
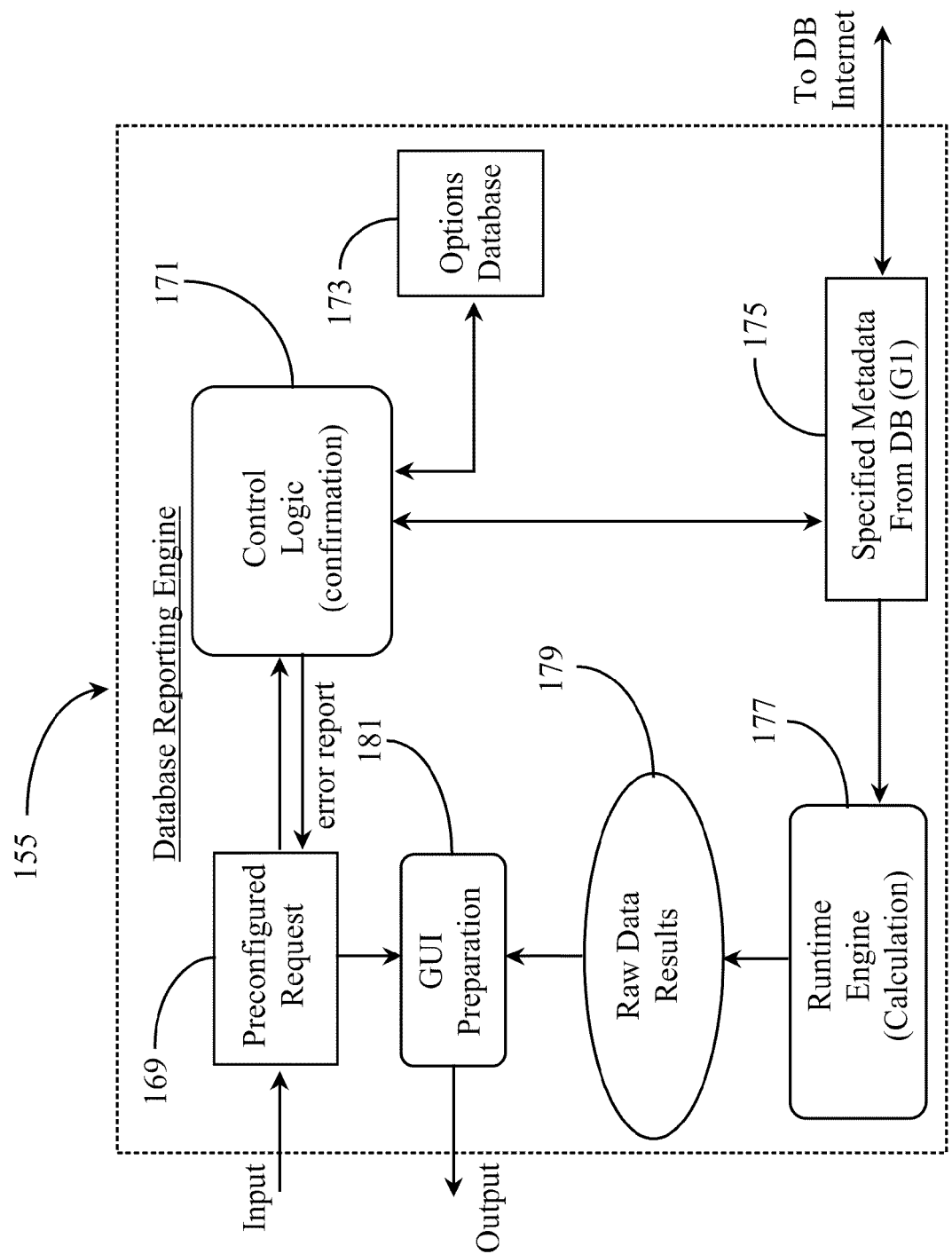
FIG. 8 is a block diagram illustrating components and functions of the database-reporting engine of FIG. 7 according to an embodiment of the present invention.

FIG. 8 is a block diagram illustrating additional detail, components and functions of DBRE 155 of FIG. 7 according to an embodiment of the present invention. DBRE 155 is a functional interface capable of obtaining, analyzing, and preparing data for presentation to a user. As such, it contains certain sub-modules responsible for performing certain required functions. For example, a control-logic module 171 is provided as part of DBRE 155 and adapted to parse and confirm a user's request as well as to insure that a user-selected presentation format is available and appropriate for the type of data result requested by a user. Such options are contained in an options database 173 illustrated as connected to control module 171 by a double arrow representing bi-directional communication.

Options database 173 may be part of DBRE 155 as illustrated herein, or part of repository 157 and made accessible to DBRE 155. In the case of DBRE 155 maintaining its own databases such as options database 173, and a previously described database containing user histories across multiple accounts, then DBRE 155 would be resident in a machine having enough storage memory to hold all required data. Such a machine could be a processor/server. In another embodiment, all stored data is held in repository 157.

DBRE 155 also has a runtime engine 177, which performs data analyzing and calculation in order to form specific data results or solutions for users based on user request. Engine 177 has access to all of the mathematical tools and system knowledge required to perform its objectives which can vary considerably. A knowledge base (not shown) may be used as a source of intelligence for engine 177 as is generally known in the art of configuration models.

Engine 177 performs a wide variety of mathematical functions including such as statistical analysis, summing, averaging, and so on. In one embodiment, algebraic, geometric, and trigonometric functions are also provided for performing more complex calculations. In most cases however, user requests will be geared more toward averaging, summing, predicting probabilities, deriving percentages, and so on. For example, summing multiple bank balances would be a common task. Analyzing on-line spending trends across multiple on-line shopping services would be another example of a common task. A more complicated report might compare shopping trends with income potential and produce a ratio figure along with recommended ways to improve on the ratio without sacrificing needed goods. There are many possibilities.

A graphics user interface (GUI) module 181 is provided within DBRE 155 and adapted to prepare data according to requested format and a requesting display type. GUI module 181 has knowledge of which presentation option was selected from options database 173, and knowledge of the parameters (hardware and software platform) of a particular device or station that will receive a report. It is not required that a report be directed back to an originating device. In some embodiments, a user may direct a meta-summary report to alternative receiving devices over different mediums. This assumes, of course, that the receiving devices and data networks are known to the system.

In practice of the present invention, a user initiates a request illustrated herein as an arrow labeled input to a pre-configured request 169 from such as his or her browser interface. Request 169 is parsed for meaning in control-logic module 171. If there is an error detected in the original request 169, such as missing information or an option selection that is not available, then an error report is immediately sent back to that user as illustrated by the arrow labeled error report. Control-logic module 171 may check options database 173 to determine if an unavailable option was selected and present an alternative available option back with the error report.

Once module 171 has confirmed a request and confirmed a presentation option, it accesses a guard (GI) 175 resident on the client side of such as repository 157 of FIG. 7 to see if there is enough current data stored therein to enable formulation of a valid result. Data obtained from repository 157 of FIG. 1 by way of database interaction is included in guard 175 and passed to engine 177 for processing. If however, a required portion of data is missing from repository 155, GSS 159 of FIG. 7 may be invoked to retrieve the requested data. An error message may, in this case, be sent back to a user informing him of a requirement to navigate for a portion of required data.

All of the data required to return a requested report is funneled into runtime engine 177. All of the appropriate calculations are performed and the resulting data illustrated herein as raw data-results 177 is passed into GUI module 181. GUI module 181 then prepares the result data for presentation to a user illustrated herein as an arrow labeled output.

As described above, a report may be very simple or quite complex, including text and graphical elements as well. In one embodiment, all of the process steps performed on included data may be broken down and reported to a user along with a final result. Presentation options may include spreadsheets, graphs, text reports, pie charts, and so on.

In the example presented above, DBRE 155 is a multi-functional module that may be broken down into cooperating sub-modules. However, this is not required to practice the present invention. One with skill in the art will recognize that there are other orders of modules and distribution paths that may be utilized to accomplish the same function. For example, DBRE 155 (FIG. 7) may interface directly with GSS 159 (FIG. 7) instead of being enhanced for gathering from aggregated data. In this case GSS 159 would first check repository 157 before determining if navigation is required. In another embodiment navigation may be required by default to insure that all data in aggregation is current. There are many possibilities.

Figure 9:
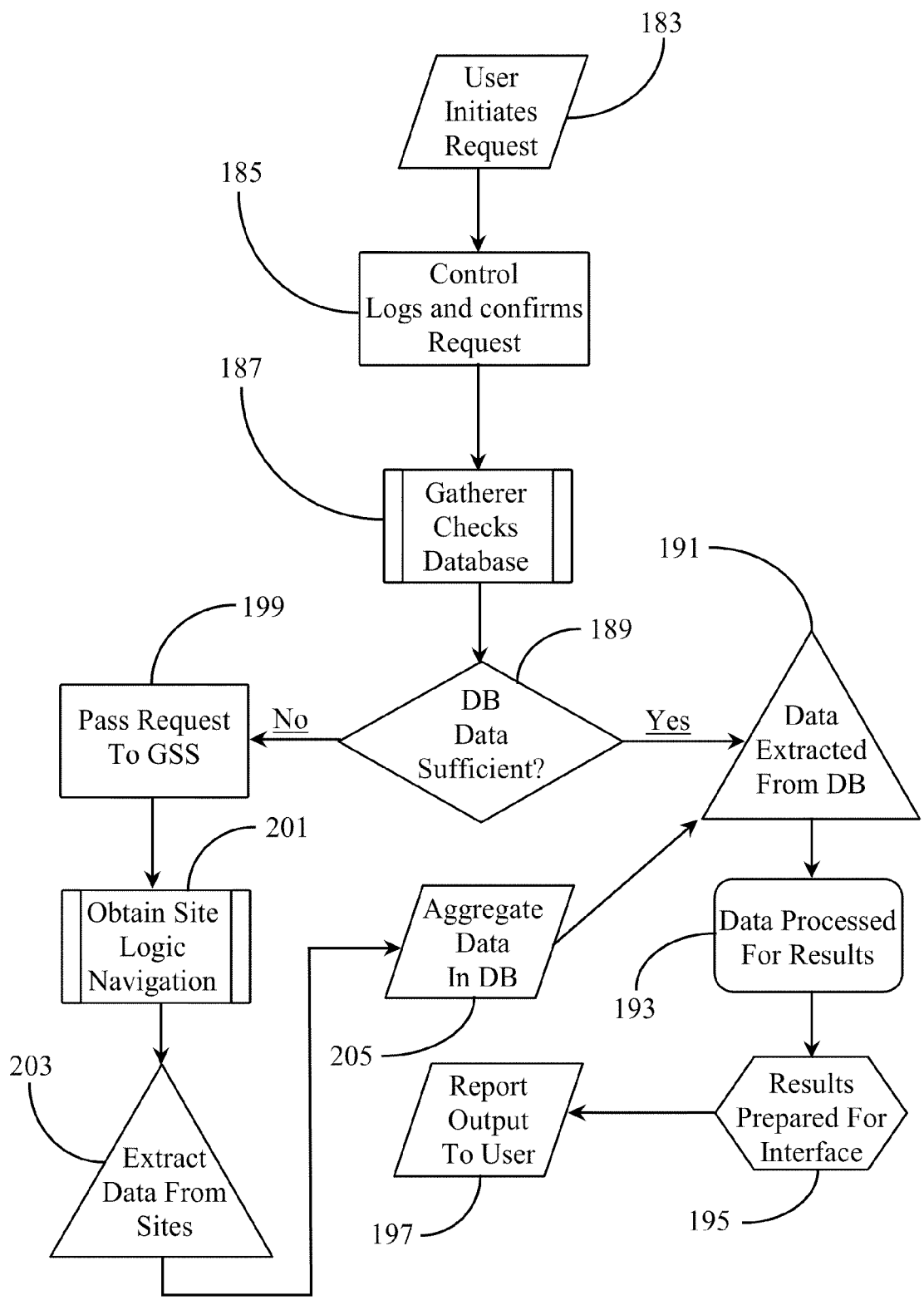
FIG. 9 is a process flow diagram illustrating logical user and system steps for initialization to completion of a meta-summarized report according to an embodiment of the present invention.

FIG. 9 is a process flow diagram illustrating logical user and system steps from initialization to completion of a meta-summarized report according to an embodiment of the present invention. At step 183, a user initiates a meta-summary report request from such as PC 163 of FIG. 7 using a browser/portal interface. A request might be to sum all of my interest earnings from all of my interest bearing accounts over a 1-year period and return a monthly average. In a preferred embodiment such a request may be made in a "natural language" understood by the portal software.

At step 185, control logic registers and confirms feasibility of the original request. This step includes parsing the request, confirming a presentation option, confirming presentation delivery parameters (software, hardware, medium) and so on. Once a request is approved for action, a data gatherer at step 187 accesses the database, such as in repository 157 (FIG. 7) for required data. Such a gatherer, termed a bot by the inventor, may be part of DBRE 155 as illustrated in FIG. 8, or part of GSS 159 of FIG. 7.

At step 189 it is determined whether or not there is sufficient data available in aggregation to complete the request. If the decision is yes, then the required data is extracted from the database (DB) in step 191. At step 193 the extracted data is processed according to tools that accomplish the user's request, which is a solution-orientated result. Text records of processing may also be forwarded to a user if requested. In this way a user might review several steps taken to arrive at a solution-oriented result.

At step 193, the raw result data is prepared according to user-requested presentation options in such as GUI module 181 of FIG. 8. A presentation option may consist of simple text results appearing on a user's portal home page. In one embodiment, a separate WEB page may be constructed that displays varied versions of the same result such as a time chart, a text paragraph explaining the chart, and a table reflecting result values. A meta-summary dealing with an averaged interest rate, as described in an example above, may be presented in a variety of ways. For example, each account and individual result may be listed, followed by a summed result over a particular time span, followed by an average figure over a smaller increment of time. There are no limits to presentation possibilities as long as the appropriate software containers are supported at both ends of the interaction. In most cases, a browser interface supporting full interactive function will be utilized. In step 197, the prepared GUI data is sent to a requesting user such as one operating PC 163 of FIG. 7 over an Internet connection such as connection 161. It should be noted here again that many devices are capable of effecting an interface with DBRE 155 of FIG. 8 and receiving result data. The success of configuring varied devices to the system will depend on provided network and data interfaces.

If in step 189 it is determined that there is not enough data or the right kind of data already in aggregation to complete a request, then the request is passed over to a GSS, such as GSS 159 of FIG. 7 in step 199. In one embodiment gathering is the sole responsibility of GSS 159 as has already been described. In step 201 site logic templates are obtained from such as a KW operating a PC such as PC 167 of FIG. 7. If the navigation templates required are the same as templates that have been previously used, then such templates may be obtained from a connected data store.

At step 203, a GSS such as GSS 159 of FIG. 8 navigates to and extracts data from required WEB sites in order to complete the aggregated data store on behalf of the requesting user. At step 205, the data is passed into aggregation in a database assigned for the purpose in such as repository 157. After all of the required data has been aggregated in step 205, steps 191 through 197 are repeated.

It will be apparent to one with skill in the art that the process steps described above represent a mostly automated or completely automated process. Moreover, there may be other sub-routines added without departing from the spirit and scope of the present invention such as adding a user notification step in the event that in step 189, data is insufficient.

It will also be apparent to one with skill in the art that a process routine such as the one described herein may be altered according to an alternate operating environment without departing from the spirit and scope of the present invention. For example, if a user is interfacing from a wireless device through such as a data center network interface, then added steps may be required to convert data to a format understood on a different network. There are many diverse applications.

Figure 10:
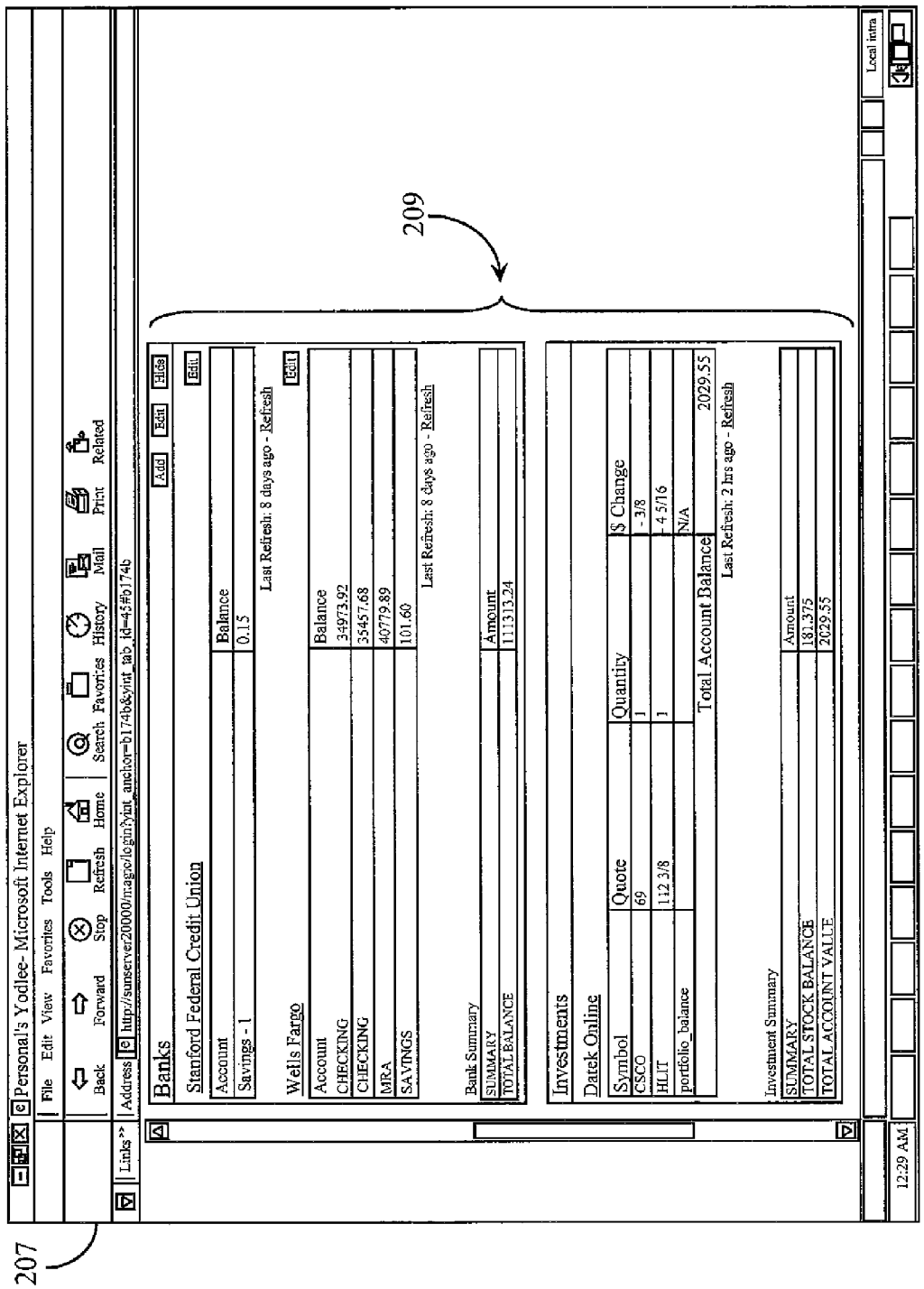
FIG. 10 is a representative view of an actual screen shot of a meta-summarized report on display in a user's browser interface according to an embodiment of the present invention.

FIG. 10 is a representative view of an actual screen shot 207 of a meta-summarized report 209 on display in a user's browser interface according to an embodiment of the present invention. In a more common implementation of the present invention, a user interfaces with such as a portal server by utilizing a common browser interface, many brands of which are known in the art and readily available. In this particular example, a Microsoft™ browser application known as the Internet Explorer™ (IE) is used. However the system of the present invention works with any software interface capable of navigating a data packet network.

Summary report 209 consists of individual bank, investment and account listings complete with the names of the institutions. Summaries of the individually reported information for both bank accounts and stock accounts are found beneath each group listing. Report 209 is a rather simplified example of many graphical possibilities and presentation methods. Depending on the complexity of a request, a meta-summarized report may contain virtually any type of presentation mediums. Some examples include, but the invention is not limited to limited to, Gant charts, time graphs, pie charts, flow charts, text summaries, and so on. In another embodiment, a summarized report may contain interactive options for looking at the same data in different ways, or even calculating further results from the results presented. A user has many options when accomplishing interface with the system of the present invention through a fully functional browser application installed on a powerful PC. Interface through other devices such as personal digital assistant's, cellular telephones, and the like will obviously limit presentation options, however, the use of such devices for interface is possible and may, in some situations, be preferred. Such situations may be business meetings, interviews, and other situations wherein a user may need to access some summary data, but does not have access to his personal computer station. Moreover, such data may be previously ordered and sent to a place other than at his or her personal computer. With appropriate interface to telephony networks, such information may, if directed by a user, be faxed to a meeting place, e-mailed to an associate's e-mail address, and so on. There are many diverse applications, many of which have already been stated.

Multiple Point-of-Access Summary Interface

According to a preferred embodiment of the present invention, an interactive software interface suite is provided and packaged to enable multi-point access to deeper levels of summary data as well as transaction and direct account access capabilities.

Figure 11:
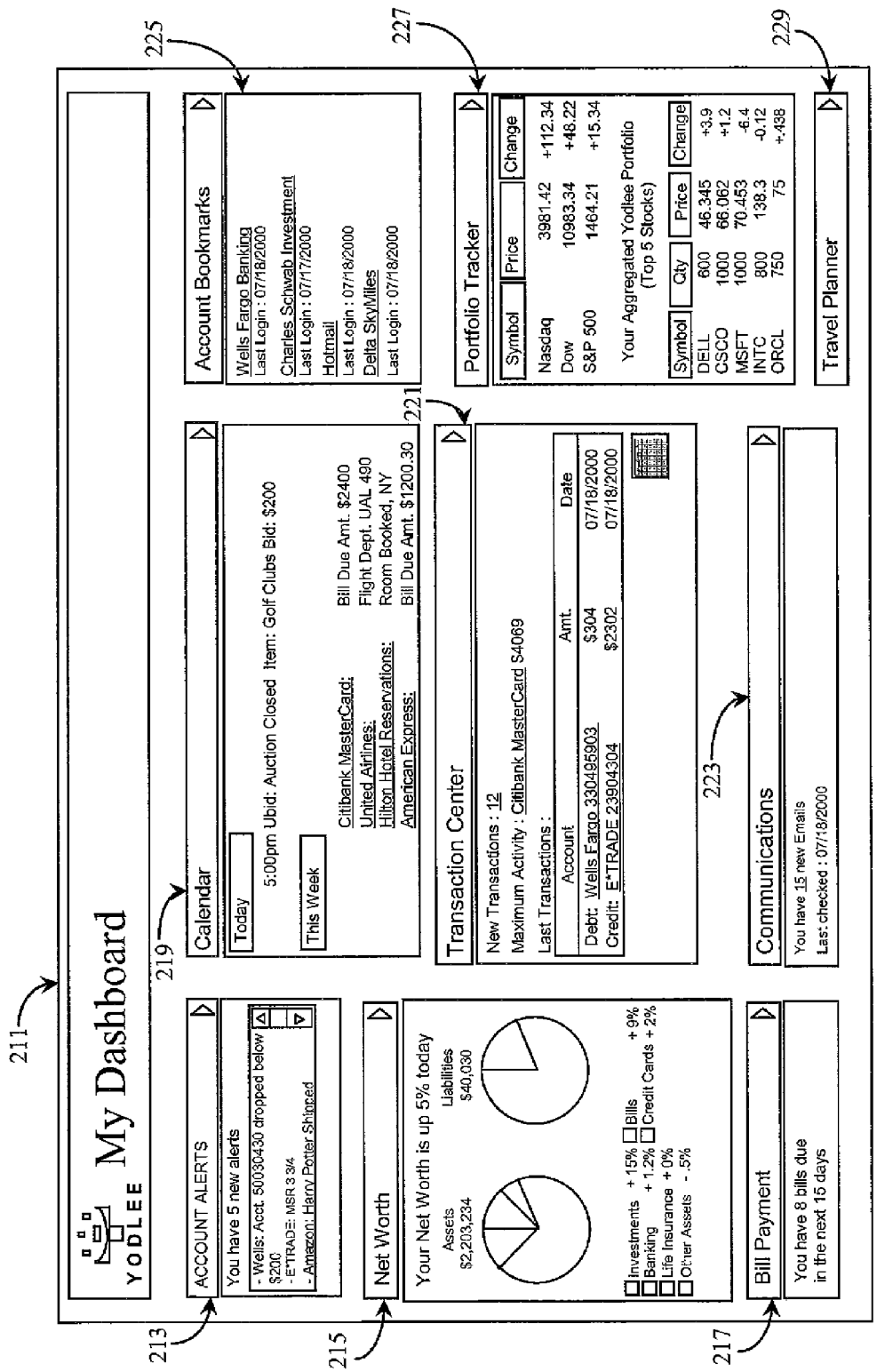
FIG. 11 is an exemplary screen shot of an interactive interface suite for enabling multipoint account management capabilities according to an embodiment of the present invention.

FIG. 11 is an exemplary screen shot of interactive interface suite 211 for enabling multipoint account management capabilities according to an embodiment of the present invention. Interface suite 211, termed a Dashboard by the inventors, provides a single interactive center for viewing summary data and for performing various transaction tasks related to data available through the interface. Interface 211 is described as a suite because it is composed of a plurality of sub-interfaces categorized in general by the type of data and functionality available through interaction with them. The plurality of sub-interfaces forming interface 211 are, in this example, packaged in the form of a single dynamic Web page using hypertext-markup-language (HTML).

Referring now to FIG. 10, interface 211 replaces interfaces 207 as a more functional, organized, and user-friendly interactive interface for receiving summary and solution-oriented data.

Referring now to FIG. 7, exemplary user 163 accesses services by interfacing with portal interface 153 via Internet access line 161. Interface 211 is adapted to be served to user 163 in the form of a Web page that his dynamic nature meaning that it is continually updated with new information. Referring now to FIG. 8, database reporting-engine 155 provides the data preparation and calculative services necessary for enabling the enhanced display capabilities of interface 211 and related sub-interfaces.

In this example, interface 211 is made up of 9 sub-modules each module providing a different class of functionality. An Account Alerts module 213 is provided within interface 211 and adapted to display various types of user-configured alerts that may be applied to a wide range of user account types. A Net Worth module 215 is provided within interface 211 and adapted to report a user's net worth information as determined through calculation related to data associated with all of the user's financially related accounts, assets, and financial activities. Module 215 is illustrated in this example as presenting dynamic graphics in the form of pie charts describing a user's current assets and liabilities.

A bill Payment module 217 is provided within interface 211 and adapted for user configuration to report parameters related to bill payment. A Calendar module 219 is provided with interface 211 and adapted to hold all of a user's pending data-sensitive information. A Transaction Center module 221 is provided within interface 211 and adapted to list and summarize all of a user's online and manually input transactions. A Communications module 223 is provided within interface 211 and adapted to report parameters associated with a user's online communications applications.

An Account Bookmarks module 225 is provided within interface 211 and adapted to list all of a user's Web services in the form of hyperlinks, which are enhanced with automatic login functionality (known to inventor). A Portfolio Tracker module 227 is provided within interface 211 and adapted to follow and report parameters related to the user's favorite stocks and other investment vehicles. A Travel Planning module 229 is provided within interface 211 and adapted to enable a user to initiate, create, and manage travel itineraries including all parameters related to ticket purchase, hotel accommodations, car rentals, and other related tasks.

All of sub-modules 213-229 are interactive in the sense that a user invokes each module in order to obtain more detailed information regarding the types and classes of dynamic data handled by the invoked module. Therefore, data visible on the "face" of each module represents initial summarized updates that are exploitable for further details.

In one embodiment, further interactive enhancement is included in sub-modules 213-229 that list service providers maintaining accounts for users. From within these modules, the actual login service pages of those entities are accessible through provision of the appropriate hyperlinks to those pages. In addition to providing direct access to a user's service-providing entities through modules 213-229, hyperlinks to one or more configuration utilities associated with one or more modules servicing a particular class or type of data may also be provided. Another enhancement provided by interface 211 is that various sub-modules exemplified herein are interlinked with each other through database reporting engine 155 of FIG. 8 such that they may share overlapping data and cooperate with each other in prioritized or other fashions with regard to the presentation and reporting of data that may be associated or linked to more than one of the individual modules.

Referring now back to FIG. 8, data input leading into request module 169 of database reporting engine 155 may contain configuration input and request data from one or more utilities (not shown) that may, in preferred embodiments, be accessible through interface 211 of FIG. 11. Output from GUI preparation module 181 is channeled for display into the proper sub-module or modules ordering the data. Any particular display characteristics provided as options are stored in options database 173 and the products of user pre-configuration.

Referring now back to FIG. 11, Account Alert module 213 informs a user upon initial display of interface 211 of, in this case, 5 new alerts related to various types of accounts. For example, a listed Wells Fargo™ balance is shown to have dropped below a $200.00 balance threshold. Another listed alert informs a user that a Harry Potter© book ordered from Amazon™ has shipped. Alerts module 213 may be pre-configured to provide virtually any type of time or event-sensitive alert that a user may desire. By clicking on any of the listed alerts, a user may be hyper-linked to the appropriate sub-module responsible for the detailed data and account entity associated with the alert.

Net Worth module 215 uses the calculative and logic functions provided by database reporting engine 155 of FIG. 8 to present a periodic report summary of a user's current net worth. In this example, both assets and liabilities are graphically illustrated and color-coded to individual categories of assets or liability. It is important to note herein, that data results presented in module 215 may be derived from virtually every online account accessible to a user through interface 211. In one embodiment, the color-coded categories are interactive such that by clicking on them as hyperlinks sends a user to an appropriate sub-module wherein more detailed information is provided. Also in this embodiment, by clicking on one of the graphics, a pop-up display containing detailed report figures may be displayed. It is also noted herein, that all of the listed sub-modules 213-229 have interactive navigation arrows installed on their faces, the arrows providing navigation to more detailed levels of data which are displayed in secondary interfaces associated with the main module invoked. More detail regarding Net Worth module 215 is provided later in this specification.

Bill Payment module 217 informs a user, in this example, that he or she currently has 8 bills due within the next 15 days. By clicking on the provided navigation arrow, a more detailed account listing each bill by entity and account number and due date may be presented in a secondary interface associated with module 217. In this aspect, it is noted that the payment module 217 is interlinked with Calendar module 219 and may share overlapping data.

Calendar module 219 provides first, a summary of items to occur on the day accessed and items related to calendar events within the current running week. By clicking on the navigation arrow provided, a secondary interface is served containing a more detailed calendar display. More detail about Calendar module 219 will be provided later in this specification.

Transaction Center module 221 informs a user of new transactions occurring since the last time of access. In this case there are twelve new transactions noted. A maximum activity item is displayed on the face of Transaction Center module 221 and related to a particular account, in this case, a MasterCard™ account that has seen the most transaction activity during a pre-configured timeframe, or since the last time of access. Also shown on the face of Transaction Center module 221, is a section listing last transactions. In this action, there are two transactions listed. A debit transaction is listed including an account provider and account number, the amount of the transaction, and the date of the transaction. A credit transaction is listed that includes the same account, amount, and date parameters of the debit transaction. By clicking on the navigation arrow provided on the face of Transaction Center module 221, a user may navigate to a secondary interface providing additional detail. More detail about Transaction Center module 221 will be provided later in this specification.

Communications module 223 alerts a user, in this case, of a quantity of new e-mails. In this case, there are fifteen new e-mails listed. In one embodiment the fifteen e-mails listed may be generic to one e-mail account. In another embodiment, the fifteen e-mails listed may source from various accounts. By clicking on the navigation arrow on Communications module 223, a secondary interface will appear containing listed accounts. By clicking on one of the accounts listed, a user may invoke that particular e-mail interface and receive any associated e-mails through that interface. If only one e-mail account is configured to Communications module 223, then clicking on the navigation arrow will simply bring up that account software.

Account Bookmarks module 225 provides a list of URLs to a user's registered accounts along with a date listing the last time each account was accessed. By clicking on the navigation arrow provided on the face of Account Bookmarks module 225, a user may invoke the secondary interface containing a more detailed rendering of account data.

Portfolio Tracker module 227 provides a summary view of the latest activity regarding a user's chosen stock symbols. Module 227 also provides a current summary regarding the top five stocks, in this example, contained in a user's stock portfolio. By clicking on the navigation arrow provided on the face of Tracker module 227, a user may invoke the secondary interface rendering much more detail. Similarly, clicking on any of the listed stock symbols may invoke the secondary interface dedicated to that particular symbol, the interface containing much more information.

Travel Planner module 229 provides a tool for a user to invoke when it is desired to create travel plans. By clicking on the navigation arrow provided on the face of the interface, a user may invoke a secondary interface containing a configuration utility for ordering and submitting tasks related to purchasing airline tickets, booking a hotel room, arranging a car rental, and any other travel related tasks. It is noted herein, that secondary interfaces associated with the above-described modules are, in many embodiments, utilities wherein a user may create and submit requests for task performance related to the class of data covered by a particular module. In a preferred embodiment, such utility tools enable proxy performance of online tasks. Still, hyperlinks to actual web sites may also be provided such that a user may navigate to and manually perform a task at the actual site invoked.

It will be apparent to one with skill in the art that interface 211 and associated modules 213-229 may be provided of a different look and feel as well as of differing content and data classification without departing from the spirit and scope of the present invention. The unique capability loaded into interface 211 of enabling performance of various proxy tasks, integrating solution-oriented data between more than one module of interface 211, and providing site-access to associated sites through multiple points of entry represents a level of novelty not known in current-art or prior-art interfaces. Furthermore, the unique proxy capabilities performed by the data compilation, aggregation, and summary system, known to the inventor, are fully accessible through interface 211 providing a level of user-friendliness heretofore not known in the art.

FIG. 12 is an exemplary screen shot of a secondary interface 231 invoked as a result of user interaction with module 219 of FIG. 11 according to an embodiment of the present invention. Secondary interface 231 is a detailed calendar utility accessible by invoking Calendar module 219 described in FIG. 11 above. Interface 231 is interactive according to a variety of provided options.

A resolution toolbar 235 is provided within interface 231 and adapted to enable a user to view various calendar resolutions of day, week, month, and year. In this example, interface 231 is displaying data associated with a particular calendar week (Jul. 18-24, 2000) as indicated.

A time-sensitive calendar bookmark window 237 is provided within interface 231 and adapted to show the current day of the current month of the current year. An interactive ad button 239 is provided within interface 231 and adapted to enable a user to enter a new calendar item such as an appointment, task, or other pending item. By invoking ad button 239, an interactive utility (not shown) for making calendar additions appears. Such utility contains all of the required fields and dialog options necessary for making correct calendar additions for later display within interface 231.

A show-item option window 241 is provided within interface 231 and adapted to enable a user to select specific categories of calendar entries to view within interface 231. In this example, the categories auctions, shopping, travel, bills, banking, credit cards, and investments are listed within window 241. The only category not selected for view is the category of banking. Therefore, existing calendar entries for the remaining categories, which are selected, appear as visible within interface 231. It is noted herein that calendar items pertaining to all selected categories within window 241 are restricted to items pending within the week of Jul. 18-24, 2000 has ordered by the options selected in resolution toolbar 235.

A summary view section 233 is provided within interface 231 and details actual pending calendar items existing within the time frame of Jul. 18-24, 2000 as ordered by window 241 and toolbar 235. In this example, the summary view lists the time and day of each pending item along with a summary description of each item. It is noted herein that titles of entities associated to each pending item listed in section 233 are interactive in that by clicking on them, further detail about the pending item is displayed.

Calendar interface 231, in a preferred embodiment, is cross-linked with other modules such that data incorporated therein may be affected by actions performed in other modules. For example, if a user pays a bill through the payment module 217 of FIG. 11, and that particular bill was listed as a pending calendar item within interface 231, then the action of paying the bill through module 217 results in automatic deletion of the appropriate item entry in interface 231. Such interoperability is achieved through background application-program-interfacing (API) with database reporting engine 155 of FIG. 8.

Figure 13:
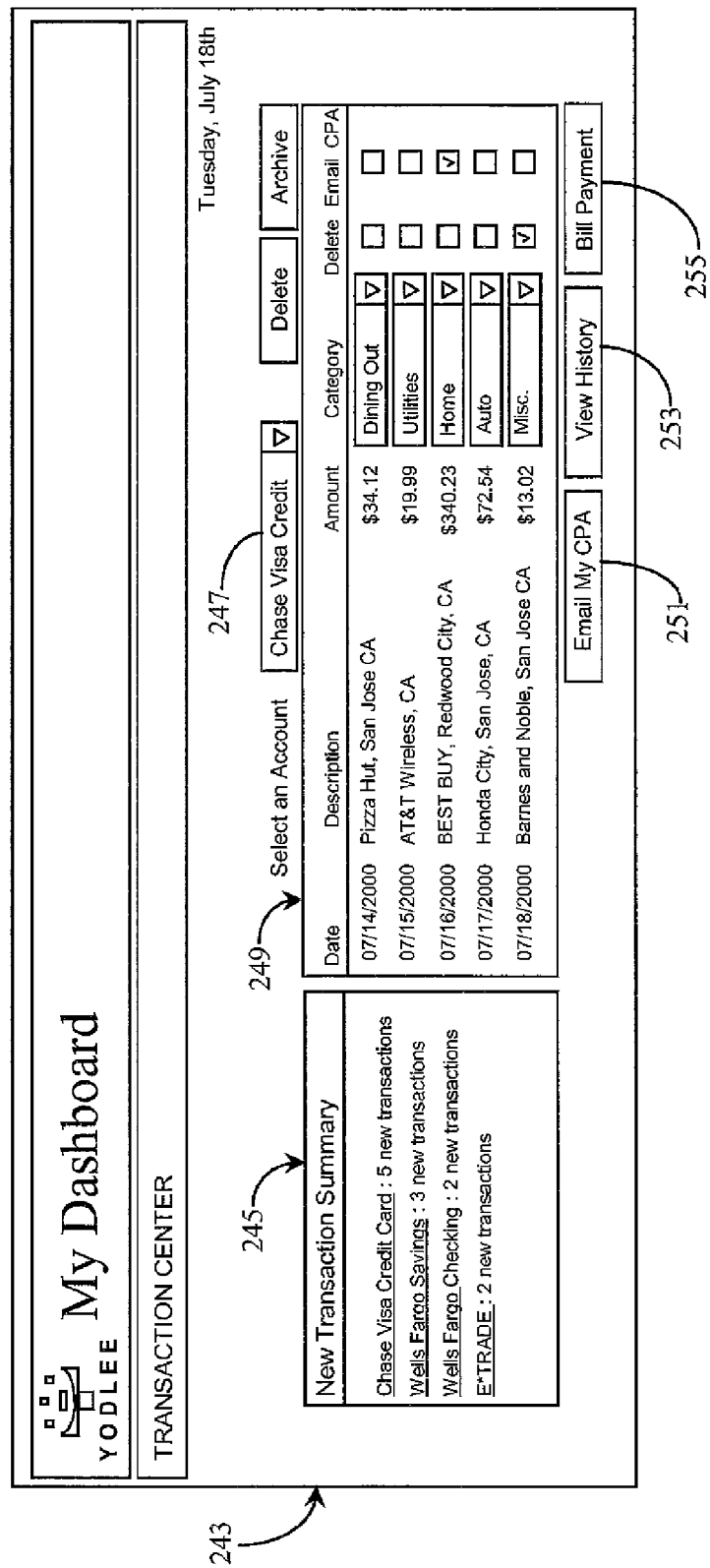
FIG. 13 is an exemplary screen shot of a secondary interface resulting from invocation of transaction center module 221 of FIG. 11 according to an embodiment of the present invention.

FIG. 13 is an exemplary screen shot of a secondary interface 243 resulting from invocation of Transaction Center module 221 of FIG. 11 according to an embodiment of the present invention. Interface 243 is an interactive interface providing a more detailed summary view of transaction data associated with a user's registered accounts. Interface 243 may be thought of as an interactive utility that enables a user to categorize all online transactions as well as off-line transactions into a simple user interface. Interface 243 is both a summary reporting tool and a transaction entry utility.

It is noted herein that interface 243 is provided in the form of an HTML interface. In this example, all of the described interfaces are displayed as HTML interfaces. However, this is not specifically required in order to practice the present invention. Interface 211 of FIG. 11 and all associated interface modules and secondary interfaces may be provided using other markup languages and programming techniques. Furthermore, much tailoring may be provided in order to adapt such interfaces to display in accordance to rules and protocols of a variety of data-access devices. For example, scaled-down versions for devices that use web clipper applications and many browsers can be provided.

Referring now back to FIG. 13, New Transactions Summary window 245 is provided within secondary interface 243 and adapted to display quantities of new transactions categorized to associated accounts. New transactions are identified, in this example, as any new transactions that have occurred since the last time of update or sense the last time of user access of interface 243. There are four accounts listed by title with each account associated with the specific quantity of associated new transactions discovered.

A scroll-down menu 247 is provided within secondary interface 243 and adapted to list all of the user's registered accounts in an interactive fashion such that selecting one of the items contained in menu 247 invokes a transaction history report exemplified herein by a history window 249. Therefore, in this example there are five transactions associated with the selected account (Chase™ Visa™ Credit). In this example, the five detailed account transactions listed in window 249 by the five new transactions reported for the same account in window 245. It will be apparent to one with skill in the art that there may be more registered accounts listed in menu 247 than are shown in summary window 245 without departing from the spirit and scope of the present invention. In this example, window 249 simply details new transactions reported in window 245.

The above-described detail of the new transactions listed in window 249 includes date, description, amount of transaction, and category. A user using a scroll-down category menu containing a list of category options may assign category detail associated with any transaction. In this way, transactions may be uniformly categorized for tax and other organizational purposes. Action items are also reported within history window 249 such as for deleting a transaction and for notification that an e-mail regarding a specific transaction was sent to a certified-public-accountant (CPA) for tax or other accounting purposes.

Other interactive options provided within secondary interface 243 include a manual delete option for manually deleting a transaction, and an archive access option for accessing archived transaction lists. Still another options include CPA-notification option 251, a view-history option 253, and a bill-payment option 255. Bill payment option 255 interlinks with bill-payment module 217 of FIG. 11, which is a utility in enabling a user to perform online bill payment.

It will be apparent to one with skill in the art that interface 243 may be provided of a different look, feel and function than that which is illustrated herein without departing from the spirit and scope of the present invention. For example, Summary window 245 may be adapted simply to provide a pre-configured amount of latest transactions without regard to system update or user access. Similarly, Summary window 245 may list all of a user's registered accounts and quantities of latest transactions instead of just those having new transactions discovered since a last update. Moreover, transactional histories may be organized and accessible according to account, transaction category, and the like.

Figure 14:
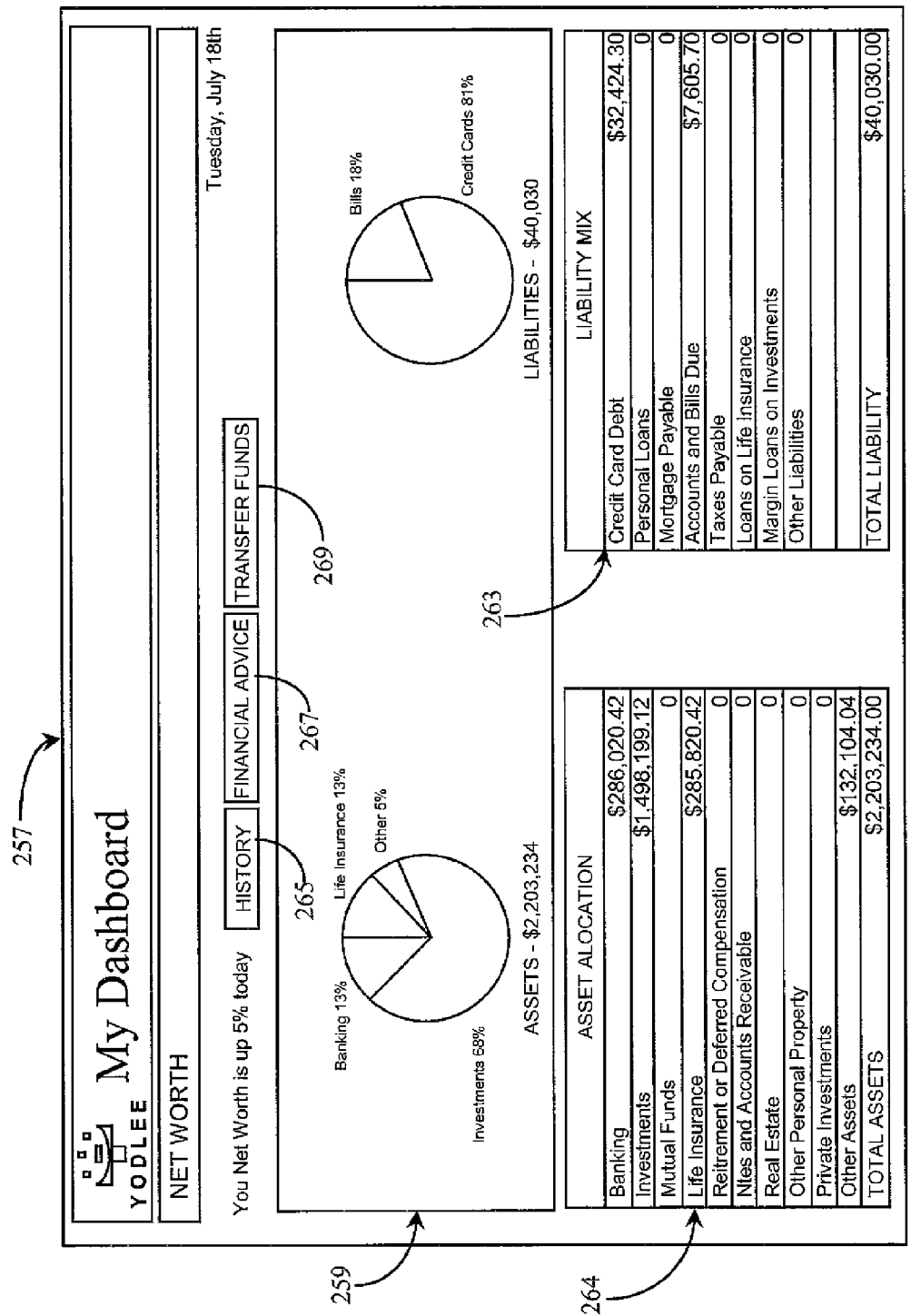
FIG. 14 is an exemplary screen shot of a secondary interface resulting from invocation of network module 215 of FIG. 11.

FIG. 14 is an exemplary screen shot of a secondary interface 257 resulting from invocation of Net Worth module 215 of FIG. 11. Interface 257 provides a more detailed view of a net worth report summarized with graphic pie charts on the face of module 215 of FIG. 11. In this view, the graphic pie charts of module 215 are visible within a provided graphics window 259. Window 259 represents a display option such as was described with reference to FIG. 8 and options a database 173. Other types of graphical representation may be utilized other than the pie charts exemplified herein. In this example, in addition to the pie charts and associated total figures, which are also represented on the face of module 215 as a summary view, actual percentages of data making up the charts are included. An Asset-Allocation window 264 is provided within interface 257 and adapted to list all of the data categories associated with asset computation and their respective totals. A Liability Mix window 263 is provided within interface 257 and adapted to list all of a user's personal financial liabilities considered in assessing a total liability. As can be seen in this example, Windows 264 and 263 are simply report mechanisms reflecting more detail associated with the graphic representation illustrated in window 259.

Net Worth interface 257 is a unique reporting vehicle that is able to provide a user with up-to-date renditions of that user's current net worth. Such a tool enables a user to modify his or her transactional behavior so as to benefit his or her total Net Worth. An interactive History button 265 is provided within interface 257 and adapted to enable a user to view net worth history over a span of time. Such a history report may be presented in the form of a graph indicating value on one axis and time on the other axis.

An interactive Financial Advice button 267 is provided within interface 257 and adapted to enable a user to obtain financial advice in the form of system recommendations and/or advice from a live financial consultant having access to the user's portfolio and transactional data. An interactive Transfer Funds button 269 is provided within interface 257 and adapted as a utility in enabling the user to engage in funds transfer activity associated with registered accounts. It is noted herein that funds transfer activities initiated from invocation of button 269 are assumed to be tasks that are performed by proxy. Although it is not illustrated in this example, invocation of Transfer Funds button 269 provides an additional interface (not shown) that will contain all of the necessary dialogue fields for facilitating transfer of monies from one account to another.

In one embodiment of the present invention invocation of Transfer Funds button 269 provides a list of accounts in the form of URLs. By clicking on these, a user may access those sites and perform manual transfer activities if so desired.

In one embodiment of the present invention, Net Worth module 215 of FIG. 11 is cross-linked with other related modules such that active bill paying, online purchasing, and payment on loans is automatically incorporated into computations for net worth reporting. As was described above, solution-oriented results may be computed from and reported to a variety of the modules described in FIG. 11.

FIG. 15 is an exemplary screen shot of a Portfolio Tracker window 271 resulting from invocation of Portfolio Tracker module 227 of FIG. 11. Interface 271 provides a more detailed rendition of the summary information reported on the face of module 227 of FIG. 11. A consolidated portfolio listing 273 is provided within interface 271 and consists of a user's stock symbols, company names, quantities of shares owned, price of individual shares, and estimated value total for each company. In this example, a solution-oriented result reflecting a summation of all of the estimated values of all of the owned stock is provided as a total position value.

An individual-holdings window 275 is provided within interface 271 and adapted to enable a user to view individual stock or investment holdings and also to navigate to actual sites maintaining the accounts as illustrated by the plurality of go buttons representing URLs. An options window 279 is provided within interface 271 and adapted to enable a user to choose only the data that he or she desires to track and view.

It will be apparent to one with skill in the art that interface 211 as illustrated and described in this specification provides all of the mechanisms for ordering, viewing, and manipulating all aspects of online, and some cases off-line user data through a single user interface accessible from an Internet-capable appliance. Data accessible through interface 211 is, in one embodiment, updated each time a user of the interface logs in. In another embodiment, data accessible through interface 211 is updated, in addition, by request termed a refresh action in the art. In still other embodiments, portions of the data accessible through interface 211 are updated by demand while other portions may be updated periodically. Still other portions of data accessible through interface 211 are continually updated in real-time. There are many possibilities.

It will also be apparent to one with skill in the art that interface 211 and functional modules provided therein or accessed thereby may be interfaced to a database reporting engine such as engine 155 of FIG. 8 by, for example, API methods, or to equivalent software functioning as database software resident on a machine having access to users aggregated data.

Interactive Bill Payment

According to a preferred embodiment of the present invention, a novel interface supporting full interaction is provided for listing bills and enabling a user to view and pay them, in many cases by proxy. The method and apparatus of the present invention is described in enabling detail below.

Figure 16:
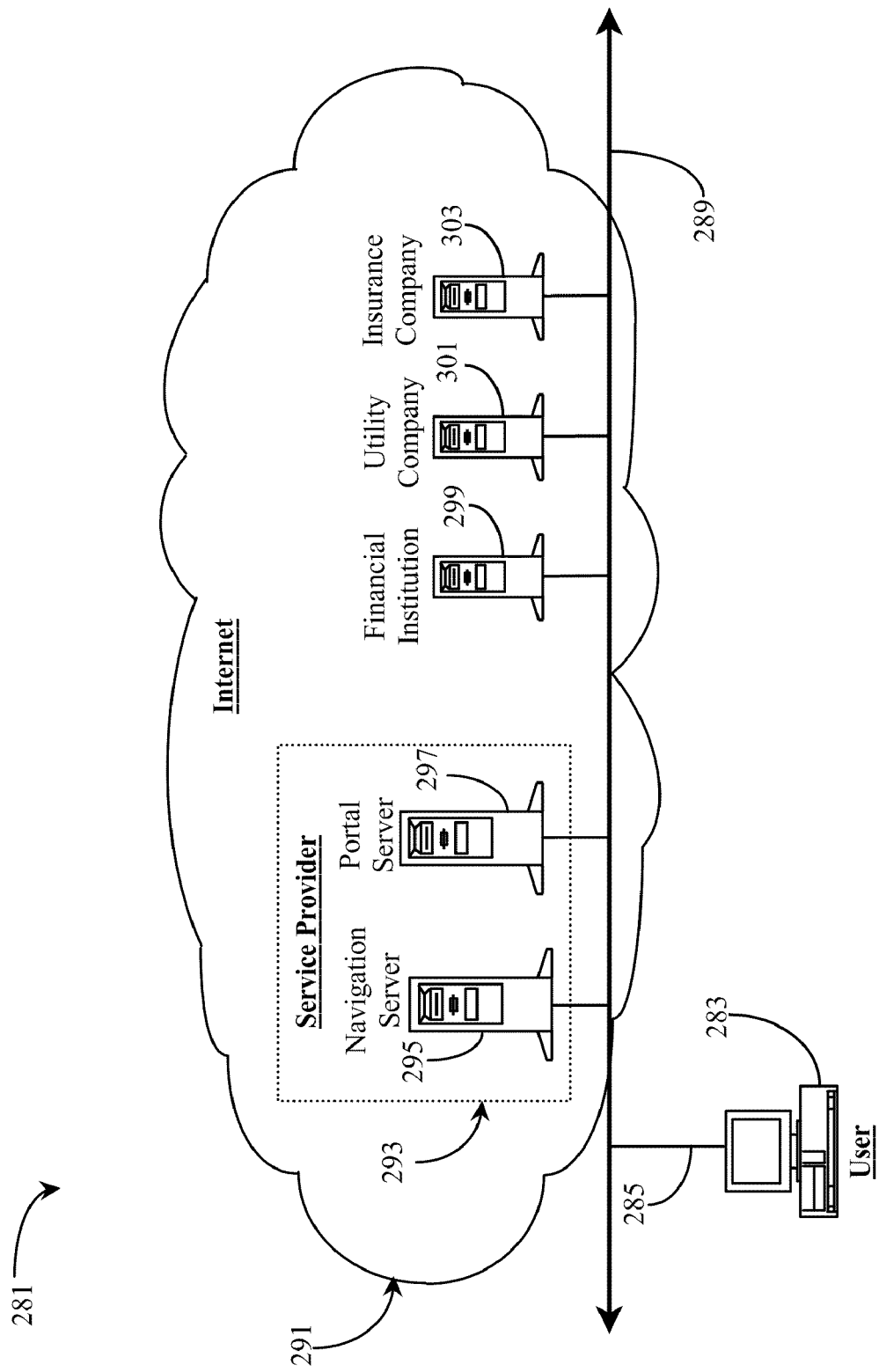
FIG. 16 is an overview of an Internet portal system and communication network wherein interactive bill listing and proxy payment capabilities are provided according to an embodiment of the present invention.

FIG. 16 is an overview of an Internet portal system 293 and communication network 281 wherein interactive bill listing and proxy payment capabilities are provided according to an embodiment of the present invention. Communications network 281 encompasses a data packet network, which in this example is the well-known Internet network, an exemplary user identified in this example by a PC icon labeled 283. Network 291 will hereinafter be referred to as Internet 291.

Internet 291 has an Internet backbone 289 extending therethrough. Backbone 289 represents all of the lines, equipment and connection points making up the Internet network as a whole. Therefore there are no geographic limitations to the practice the present invention. User 283 is connected to backbone 289 by an Internet-access line 285. Internet-access line 285 represents a logical connection between user 283 and backbone 289.

It is noted herein that line 285 may encompass any lines or equipment necessary for establishing an Internet connection for user 283. For example, user 283 may connect to backbone 289 through an Internet-service-provider accessible through a telephony network such as the well-known public-switched-telephony-network (PSTN). There are many possible Internet-connection architectures known in the art and which may be used in this example. Arguably, the most common architecture is a dial-up modem architecture. However, cable/modem, digital-subscriber-line (DSL), or integrated-service-digital-network (ISDN) may be used, as well as, various wireless and satellite technologies.

Internet portal system 293, also referred to as service provider 293, provides data compilation aggregation and summary services, which are accessible to user 283 connected to backbone 289. The various technologies enabling the services provided by service provider 293 are taught in the cross-referenced application Ser. No. 09/208,740, Ser. No. 09/323,598, and Ser. No. 09/425,626 referred to in this specification. The application entitled "Interactive Activity Interface for Managing Personal Data and Performing Transactions over a Data Packet Network", Ser. No. 09/698,708, teaches a software suite for managing data as is described in the background section of the specification. In this example, such a software suite is enabled in a portal server 297, illustrated within service provider 293, and shown connected to backbone 289. The software suite is accessible to user 283 operating on network 291. Portal server 297 is analogous to the portal interface 153 described in FIG. 7 of Ser. No. 09/425,626.

Server 297 is adapted as a file server capable of serving personalized electronic-information pages known as Web pages. Personalization as described in the specification refers to a web page interface or interfaces that are personalized to user 283. In this example, the functionality of the previously mentioned software suite for managing personal data is presented in a user-input and management sense in the form of a hyper-text-markup-language (HTML) interface. A navigation server 295 is provided within service provider 293 and adapted to perform proxy navigation to third party Websites on behalf of user 283 based on his or her interaction with portal server 297. Server 295 is illustrated as connected to backbone 289 and communicates with portal server 297 over backbone 289 in this example. In one embodiment, a separate high-speed data line may be provided to connect navigation server 295 and portal server 297 for enabling high-speed data communication.

Service provider 293 is analogous to the portal station 151 described with reference to FIG. 7 above. As such, it may be assumed herein that a repository holding aggregated data (157) and a reporting engine (RE 155) are present in this example although not illustrated. Navigation server 295 may be assumed in this example to be analogous to the gathering subsystem (GSS 159) also described with reference to FIG. 7 above.

There are three exemplary file servers illustrated in this example as connected to backbone 289 within Internet domain 291. These are a financial institution server 299, a utility company server 301, and an insurance company's server 303. It is intended in this example that servers 299-303 represent servers subscribed to by user 283. For example, user 283 may do his banking through server 299, manages utility bills through server 301, and manages his insurance accounts through server 303. User 283 as a patron of service provider 293, can manage all personal aspects of data held under the identification of user 283 in all of servers 299-303 through a single interface served by portal server 297.

This example focuses on a capability of managing and paying bills associated with servers 299-303 through an interface served by portal server 297. As described in the background section, a portion of the dynamic software suite (interactive activity interface) comprises a bill-payment module for enabling user 283 to manage and pay all of his or her bills online, and in some cases off-line bills. It may be assumed in this example that user 283 is interacting through service provider 293 to affect payment and management of personal bills associated with server 299-303 using a bill-payment module functioning as an input module operable from the user's PC. Such a bill payment module is not illustrated in this example, but may be assumed to be present and operable from the PC of user 283.

In general practice of the present invention, user 283 logs on to Internet 291 through Internet access line 285 and backbone 289 for the purpose of connecting to portal server 297. Portal server 297 authenticates user 283 and serves an interactive activity interface comprising a plurality of modules including the described bill-payment module. The interactive activity interface, served as a single HTML interface, also contains face summaries associated with personal data aggregated for user 283 by provider 293. The data summaries are presented accordingly with each presented module.

By selecting the bill-payment module of the interface, user 283 may view, manage, and initiate payment of bills by proxy through server 297 and navigation server 295. It is not necessary for user 283 to physically navigate to any of servers 299-303 for the purpose of paying bills or managing data. Server 295 using the appropriate login information required to authenticate and access the servers may perform all navigation and ordered action. However, if so desired, user 283 may connect to any of servers 299-303 by clicking on an appropriate server link provided within an operating module, which in this example is a bill-payment module. More detail regarding the unique bill-payment module and its relationship to the described activity interface is provided below.

Figure 17:
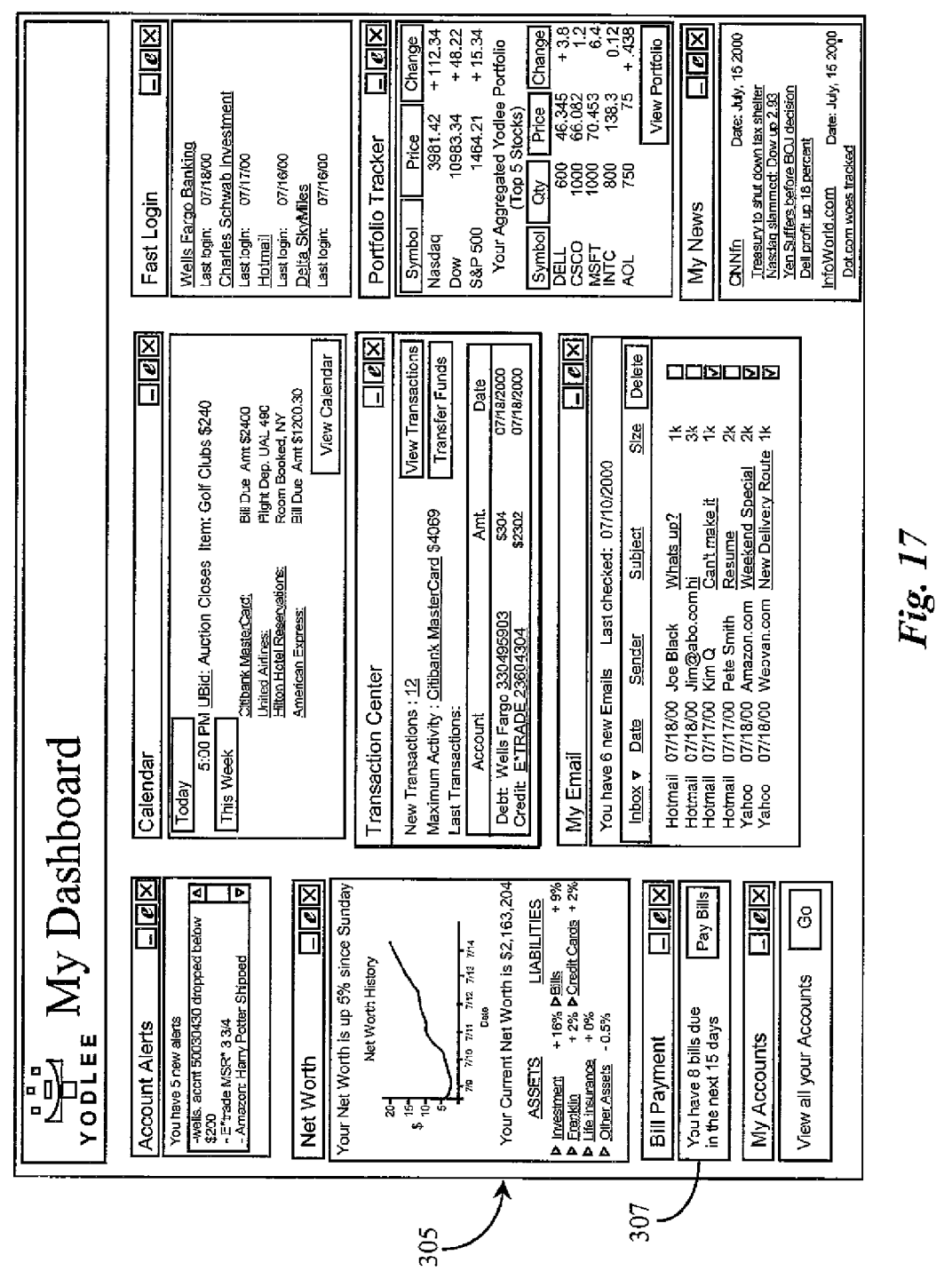

FIG. 17 is an exemplary screen shot of interactive interface suite 305 for enabling multipoint account management capabilities as described in and analogous to suite 211 of FIG. 11. Interface suite 305 contains a plurality of functional modules of which a bill-payment module 307 is one. Bill-payment module 307, analogous to the bill-payment module described in FIG. 16, has a face text summary, and a pay-bills action icon provided thereon. In this example, the text summary simply alerts a user that there are 8 bills due within a window of the next 15 days. Such alerts are pre-configured by a user according to desire. In other embodiments the text summary provided on the face of module 307 may summarize bills due now or past due bills. In still other embodiments, a text summary may describe a number of largest bills or a number of due credit-card bills. There are as many possible variations as there are descriptive parameters regarding bill data.

By invoking bill-payment module 307, a user may elect to pay bills, view bills, and perform other actions regarding bill management. The amount of real estate taken by module 307 in relationship to interface 305 may vary according to preference as well. It may be assumed that if a user pre-configures more data for display on the face of module 307, then module 307 will command more real estate. As previously described, an HTML version of module 307 is presented herein as a preferred example. However, other types of mark-up or descriptor languages may be used in alternative embodiments. This may also depend in part on the display nature of an accessing Internet-capable device.

FIG. 18 is an exemplary screen shot of a secondary interface 309 invoked as a result of user interaction with module 307 of FIG. 17 according to an embodiment of the present invention. Interface 309, labeled a bill-payment center in this example, is a secondary HTML interface presented as a result of user interaction with module 307 of FIG. 17. Interaction to produce interface 309 may be a double click on the tool-bar portion of module 307, or any other computer input action including key-board command.

Interface 309 is interactive and contains a range of user options for accomplishing account management including payment of bills. A view-history icon 323 is provided within interface 309 and adapted to present a bill history record. Such a history record may be configured to present according to any desired parameters or bill categories. For example, a history record may show all paid bills. A bill history may prioritize by date, amount, payee description, or other criteria. A bill history may be configured to enable viewing of all paid bills, or only certain paid bills. In general, as a bill is resolved through payment, it is removed from a list of un-paid bills and added to a bills history list presentable through interaction with icon 323.

A bill inbox 311 is provided within interface 309 and provides a list of current and due bills. In this example, bill inbox 311 has 6 general data columns. The first column reading from left to right is a Due-Date column. This column simply displays the appropriate due dates associated to individual ones of bills arranged in line-item form. A second column located adjacent and to the right of the described due-date column contains a list of payees representing the entities owed. The names listed under the column labeled Payee are representative only and do not constitute a limitation of possible payees. Nor do the names represent any actual entities that are required to be entered as payees within inbox 311. The inventor intends that names depicting payees are representative only. In actual practice of the present invention, a payee may be identified as any participating entity including person to person (P2P), and third party auction sites.

Next and to the right of the column labeled payee within bill inbox 311, is a column labeled Account #. The Account # column lists the appropriate account numbers specific to each payee listed in the Payee column. In some embodiments only partial account numbers are viewable within the interface for security reasons. Also in some embodiments wherein a payee does not have an account number, such as with the payee labeled Pay Pal, an e-mail address serves as an account number. An Amount Due column is provided adjacent and to the right of the column labeled Account # within inbox 311. The Amount Due column lists specific amounts due of individual bills owed. A Balance column is provided within inbox 311 and is located adjacent and to the right of the Amount-Due column. The Balance column lists standing balances owed on individual accounts.

The line item and column arrangement illustrated within bill inbox 311 is exemplary only and should not be construed as a limitation. The columns described may be replaced in order and additional columns may be added describing additional data associated with each account. A column labeled Refresh Status is provided within inbox 311 and located adjacent and to the right of the Balance column. This column provides a line item refresh status indicating an amount of time since a particular line item (bill) was last refreshed. In one embodiment, all of the values listed in the Refresh Status column may be equal if all of the bills are refreshed at the same time. A Refresh-All icon 334, located immediately above inbox 311, is adapted for that purpose. However, in this example the disparate nature of the values under the Refresh Status column indicate that each line item has been individually refreshed such as by right-clicking on a line item and selecting Refresh Item.

A Bill Toolbox column is provided within inbox 311 and located adjacent and to the right of the column labeled Refresh Status. The Bill Toolbox column provides a drop-down menu associated with each line item (bill). Each drop-down menu is, in this example, identical in function and interactive option. For example, a drop-down menu 313 associated with the first line item illustrated within inbox 311 is displayed as open showing various interactive options. A View Bill option 315 is provided within the drop-down menu and adapted to provide a full-screen display of the accounting (invoice, bill) of the associated line item upon user selection and activation. In one embodiment selecting and invoking the View Bill option causes an automated navigation and log-in into the associated payee's Web site whereupon a full statement of accounts may be viewed. In another embodiment, such a full statement may be available without navigation if a payee has previously provided it. In still another embodiment, a full statement of account may be retrieved from a payee's site on demand by proxy navigation and rendered to the requesting user.

A Pay Bill option 317 is provided within the drop-down menu and adapted to launch an interactive Pay-Bill interface that can be used to initiate payment upon user selection and activation. In one embodiment, a Pay-Bill interface may be hosted by a third party wherein automatic navigation and login connections a user to the interface. In another embodiment, the Pay-Bill interface may be hosted by the service provider identified in this specification as provider 293 of FIG. 16. The described embodiments can very per line item.

A Mark-As-Paid option 319 is provided within drop-down menu 313 and allows a user to mark a bill as paid and current, in cases wherein a bill is paid outside of the service. Marking a bill as paid will remove it from bill inbox 311 and enter it into a history record accessible through option icon 323 as previously described. A Delete option is provided for enabling manual deletion of a line item.

An Advice option 321 is provided within drop-down menu 313 and adapted to launch a specialized advice assistant that may be preprogrammed using details generic to the assigned payee. In this case, advice may be simple notes provided by the assigned payee. In one embodiment, Advice option 321 launches, through selection and invocation, a general advice assistant that is preprogrammed with data and intelligence regarding all of a users listed accounts and balances. In this case, advice may be geared to such issues as benefit or non-benefit of a timely payment, the fact that a payment will have on overall account balance on the account the line item is paid from, and so on. Such intelligent advice is enabled by virtue of the fact that the service aggregates and manages all of a user's bills and the money accounts that the bills are paid from. This information is aggregated and presented to a user to an intelligent and solution-oriented manner.

In still another embodiment an advice assistant launched as a result of interaction with option 321 may, through a provided request-and-submit form, solicit server-side calculation designed to produce solution-oriented results. One type of calculated result may be, for example, the length of time a user must pay a certain amount on a credit account before the account is fully paid.

An Alerts option is provided within the drop-down menu and is adapted to launch, upon selection and location, a configured interface enabling a user to configure automated alerts associated with a line item. Such alerts may simply be a notice at some period of time ahead of the due date, or other like notices. Once configured and automated, these notices may be propagated through the interface used by the user as described with reference to FIG. 16, or they may be sent as e-mails, pager messages, recorded telephone messages, and so on.

It will be apparent to one with skill in the art that the drop-down menu as provided in the bill toolbox column may be somewhat tailored to a particular line item without departing from the spirit and scope of the present invention. For example, some options may be grayed out and un-selectable if they do not apply to a particular line item. It will also be apparent to one with skill in the art that there may be more or fewer interactive options provided within a drop-down menu provided in the bill toolbox column and associated with a particular line item.

A payment accounts window 331 is provided within interface 309 and adapted to list each user account designated for access for the purpose of paying bills. Window 331 has 5 data columns illustrated therein and 4 line items (accounts) in this example. Reading from left to right, the data columns are labeled and adapted as follows:

An Account-Name column lists the account name of each included line item. An Account-Number column lists the account number of each included line item. An Account-Type column lists the type of account for each included line item. An Account-Balance column lists the available balances of each included line item. A final column at far right is labeled Refresh Status and is adapted in the same manner as was described above regarding the Refresh Status column in bill inbox 311. In this example, each line item has been separately refreshed.

Referring back to interactive options presented above the described bill inbox, a Recurring Payments option 325 is provided and adapted to enable the user to set-up automated payments to a same payee wherein the payments are characterized by a constant amount and paid according to a predefined frequency. A Pay-Anyone option 327 is provided as a link to a third-party site providing immediate bill pay services from a connected account. It is noted herein that all third-party sites are, in preferred embodiments, co-branded sites cooperating with the entity providing interface 309.

An interactive Calendar icon 330 provides access to a calendar view of data listed in interface 309. An interface providing a calendar view may be shared by other modules and may display additional information associated with functions other than paying bills. In one embodiment, a shared calendar interface may be tailored during display so as to show only data pertinent to the interface used when invoking the calendar. In this case, a calendar view ordered through interface 309 would only show data as listed within the interface. A Preferences option 332 is provided and adapted to enable a user to select preferences for visual display. Such preferences may include, but are not limited to font size, style and color; order of data listing such as by category, date etc; and preferences regarding any types of available graphic formats for characterizing result data.

FIG. 19 is an exemplary screen shot of a secondary interface 333 invoked as a result of user interaction with interactive option 319 of FIG. 18 according to an embodiment of the present invention. As described with reference to FIG. 18 above, selection and invocation of option 319 (Mark as Paid) enables a user to dispose of a bill listed in inbox 311 such as when the listed bill is paid outside of service. Interface 333 is a user-input form for accepting data input signifying that a particular bill is paid.

Form 333 identifies the biller as illustrated at top left. Amount due, account balance, and due date are indicated just below the biller identification in list form. An input field labeled Payment Date is provided for entering a date on which the bill was paid. An input field is provided for entering the name and type of account debited to pay the bill. An input field is provided for entering a paid amount. An input field is provided for entering a category or purpose of the bill. It is noted herein that a drop-down menu that provides a list of standard data subjects related to its associated field accompanies each data input field in a preferred embodiment. In one embodiment the fields may be populated by either selecting from the drop-down menu or by typing in a parameter.

At bottom right of form 333 is a cancel icon for canceling the request before completion, and a Mark Paid icon for submitting a populated request. Upon receipt of a populated Mark Paid request (333) at server side (portal 297, FIG. 16), the record of the paid bill is removed from inbox 311 described in FIG. 18. The record of payment of the bill is entered into an appropriate history record.

FIG. 20 is an exemplary screen shot of a secondary interface 335 invoked as a result of user interaction with option 321 of FIG. 18 according to one embodiment of the present invention. Interface 335 is adapted as a user input form that may be populated and submitted in order to solicit a solution-oriented result regarding, in this example, time required to pay a particular installment debt such as a credit card debit.

Interface 335 has a drop-down menu provided at top and left of center for choosing a pre-configured credit card calculator. More specifically, a credit card calculator, as it is termed by the inventor, is not a visual calculator, but rather a version of interactive form (interface 335) that is tailored to a specific credit account selected for accounting from the drop-down menu. Form 335 is an interactive interface comprising two interface windows. These are an Inputs window, as so labeled, and a Results window containing an interactive results icon for repeated results display for different accounts.

In the window labeled Inputs, there are 6 input fields arranged in a column with field descriptions set off to the left of each field. Reading from top to bottom within the window labeled Inputs, the first field is for entering an amount owed. The second field is for entering future monthly charges billed to a user. The third field is for entering a monthly payment to be paid by the user. The fourth field is for entering the annual percentage rate on an unpaid balance of the selected account. The fifth field is for entering an annual fee if any. The sixth field is for entering a desired number of months (goal period) for paying off the account.

Below the just-described input fields are input fields for entering a future rate change representing a projected increase or decrease in future percentage rate imposed on unpaid balances. Selection fields accompany these fields including a selection field labeled none.

A user populates the provided fields in the inputs section, and then invokes the results icon, which causes a text advice summary and an accompanying graphic representation of a result to appear. It is noted herein that all of the results calculated are done so based on the immediate user input in the inputs section on a per account basis. An interactive option labeled Table is provided within the results window adjacent and to the right of the Results icon. Invoking Table causes graphic results in the form of a table of data to appear in addition to or in place of the illustrated graph.

It is important to note herein that backend software supports all of the intended functionality available through interface 335. FIGS. 7 and 8 of Ser. No. 09/425,626 teaches one embodiment that enables intelligent advice generation and calculation that is initiated through interface 335.

It will be apparent to one with skill in the art that the look of interface 335, that is the way features are presented, may change according to request or design without departing from the spirit and scope of the present invention. For example, instead of a line graph or a table, some other graphic representation may be provided as an additional option for viewing results within the results window. It will also be apparent to one with skill in the art that the number and arrangement of input and selection fields are illustrated within the inputs window may change somewhat according to the type of account for which calculations are to be performed. For example, if calculation is to be performed in association with a mortgage account instead of a credit card account, the input fields and selection fields may vary considerably in description and order including inclusion or exclusion of fields. It is important to note here that the look and feel of interface 335 is dependent upon the nature of the account that the interface is configured for. However, that is not to say that a generic interface cannot be used.

FIG. 21 is an exemplary screen shot of a secondary interface 337 invoked as a result of user interaction with module 323 of FIG. 18 according to an embodiment of the present invention. Interface 337 is invoked as a result of interaction with the History icon 323 from within interface 309 of FIG. 18. Interface 337 is a Bill-Payment-History record and is adapted to list payment and transfer transactions that have been initiated by a user working within interface 309. In this example, a user's last 10 payment and transfers are illustrated. As with other interface as described in this specification, pertinent data is arranged in both line item and column form. That is to say that each line item is reflected horizontally with the different data categories arranged in columns.

Reading from left to right within the bill payment history window, a first column describes the Date the bill was paid for each line item. A second column describes current Status of a payment action associated with each line item. For example, the first four line items indicate status pending in the status column. The term pending simply indicates that the initiated transaction is in process but not complete. The next three line items show a status indication of Complete meaning that the payment transaction for each line item has been completed successfully. The next line item shows a not sufficient funds (NSF) indication meaning that the transaction was not completed due to lack of funds in an account used to pay the bill. The following line item shows a rejected status in the second column meaning that the transaction was rejected for some other reason than not sufficient funds. Reasons for rejection may include errors in processing, incorrect account information and so on.

In this example, there is an interactive text icon labeled Next 10 Payments. By invoking this icon, a user may view the next 10 payments listed in the history record. In one embodiment, a scroll function is provided to enable a user to scroll down to view additional line items. It is noted herein that there may be many line items accessible through interface 337 and line items may be arranged according to a variety of ordered criteria including by date, by amount (largest or smallest first), by account used to pay the bill, by chronological order of identified payees, or by any other feasible order which may include a combination of the above-described orders. In one embodiment of the present invention, several disparate historical records may be kept describing disparate aspects of payment and transfers. One example would be a historical record of all rejected transactions. Another example would be that of a separate historical record for all transactions having tax-deductible properties. There are many possibilities.

FIG. 22 is an exemplary screen shot of a secondary interface 339 labeled Transfer Funds, invoked as a result of user interaction with module 329 of FIG. 18 according to an embodiment of the present invention. Interface 339 is adapted as an interactive interface allowing a user to transfer funds from one financial account into another financial account. Interface 339 is accessible from the transaction center module illustrated in a center column provided within interface 305 of FIG. 17. The point of entry is illustrated as an interactive Transfer Funds icon. An identical Transfer Funds icon, which is an interactive hyperlink, is also illustrated as interactive icon 329 in FIG. 18. Therefore, Transfer Funds interface 339 is an interface shared by more than one major data-management module.

Although interface 339 is an independent module accessible from a number of interfaces provided in the parent interface 305 of FIG. 17 including interface 309 of FIG. 18, the functionality of transferring funds is important to a bill paying process. For example, a user may need to transfer funds from one account to another in order to enable that account to support payment of a particular bill or bills. Therefore, this example and examples to follow will detail aspects of transfer funds interface 339.

Interface 339 comprises a Transfer Funds window for enabling a user to initiate funds transfers between accounts and to add new accounts into the system. At top left of the Transfer Funds window an input field labeled Transfer is for entering a transfer amount. An input field provided immediately below the just-described Transfer field is adapted for entering the transfer date. It is important to note herein that the transfer date may be the same date a user initiates a funds transfer, or the date may be a future date where upon arrival the initiated transaction will take place.

There are two drop-down menus provided within the transfer funds window. These drop-down menus are adapted to list accounts from which monies are transferred and accounts to which money is transferred. This is illustrated by the labels From and To accompanying each respective menu. Generally speaking, each participatory account is identified in both drop-down menus. In practice of transferring funds, a user first selects an account listed in the From menu and then selects an account listed in the To menu. A Transfer Funds icon 341 functions as a submission icon for the transfer funds order configured within and initiated from the Transfer Funds window. A Cancel icon is provided to cancel a transaction in process. An Add Account icon is provided and adapted to enable a user to configure and add a new account to the described drop-down menus. It is noted herein that invocation of the add a new account icon illustrated within the transfer funds window launches an interactive configuration and submission form adapted for the purpose.

A dynamic results window labeled Pending Transfers is provided within interface 339 and located immediately below the above-described Transfer Funds window. The Pending Transfers window is simply adapted to show a user the progress of the pending transfer. If a user has initiated several transfers to execute at future dates, then this window is useful for reviewing and reminding a user of such pending transfers. It is noted herein that while a transfer is pending and not yet executed, a user may recall the order and alter or cancel it. This may be accomplished by simply double-clicking any line item viewable within the pending transfers window. An interactive icon labeled Inquire is provided within the Pending Transfers window and adapted to enable a user to inquire as to the status of a pending transfer. This icon may also be used in some embodiments to recall the pending transfer for alteration or cancellation.

A Payment and Transfers history window is provided within interface 339 and located to the left and below the described Pending Transfers window. In this example, the Payment and Transfers history window is analogous to interface 337 of FIG. 21. That is to say that at least in one embodiment the payment and transfer history window illustrated herein is a summary view of interface 337 of FIG. 21. In another embodiment, this history record may be specific to funds transfer orders only.

An Active Balance window is provided immediately below the Pending Transfers window and to the right of the Payment and T
Transfer History window. This window is adapted to provide a current accounting of available balances of accounts registered to the transfer funds service.

Figure 23:
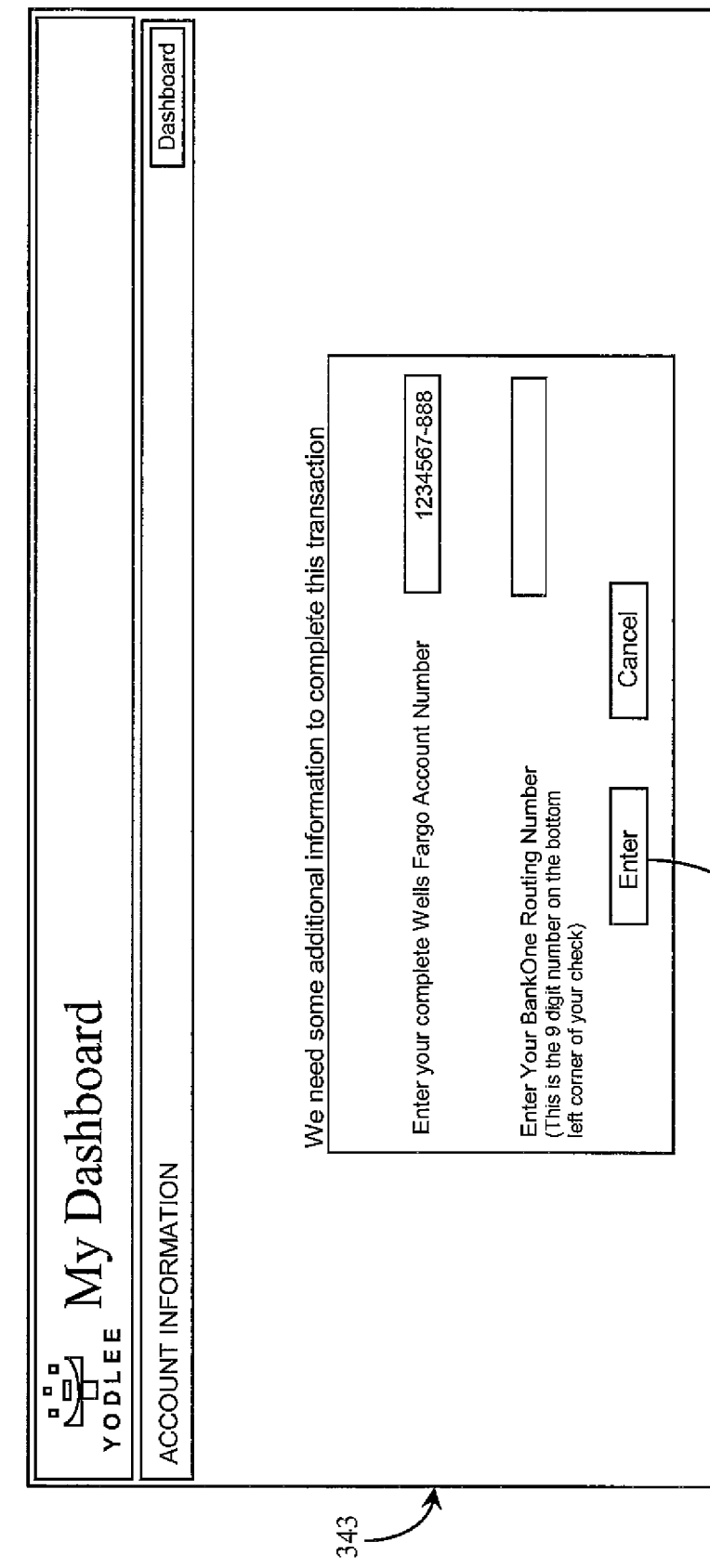
FIG. 23 is an exemplary screen shot of a secondary interface invoked as a result of user interaction with icon 341 of FIG. 22

FIG. 23 is an exemplary screen shot of a secondary interface 343 labeled Account Information invoked as a result of user interaction with icon 341 of FIG. 22. Interface 343 enables a user to add account information that may not already be known to the system for consideration in funds transfer activity. Interface 343 is an interactive input form with an input field for entering an account number (routing number) of a Transfer-To account. Interface 343 may be optional in some embodiments and may be presented with a variety of input fields corresponding to fields wherein information is not known to the transfer funds system. Similar to other interface is described, a Cancel button is provided for canceling a transaction in process.

Figure 24:
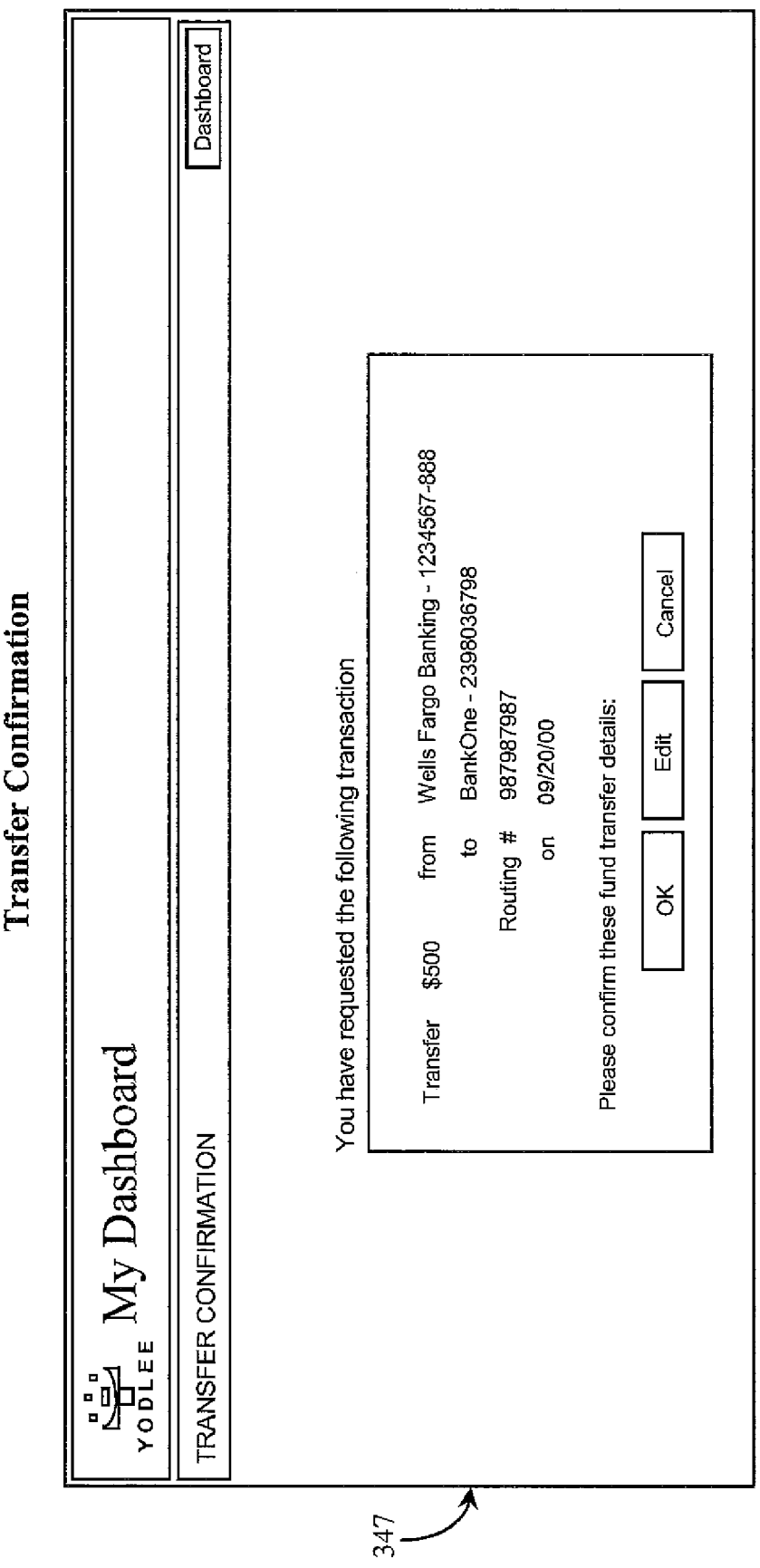
FIG. 24 is an exemplary screen shot of a secondary interface invoked as a result of user interaction with module 345 of FIG. 23 according to an embodiment of the present invention.

FIG. 24 is an exemplary screen shot of a secondary interface 347 labeled Transfer Confirmation invoked as a result of user interaction with module 345 of FIG. 23 according to an embodiment of the present invention. In all transfer funds cases the Transfer Confirmation interface 347 is provided to appear at submission of a pending transaction. Interface 347 simply presents the entered parameters of a pending transaction at submission the purpose of confirmation and opportunity for edit in a case where one or more parameters are entered in error.

FIG. 25 is an exemplary screen shot of an optional third-party interface 349 invoked as a result of user interaction with option 317 of FIG. 18 according to an alternate embodiment of the present invention. According to this embodiment, invocation of option 317 provided in a drop-down menu associated with a particular line item listed in described in FIG. 18 initiates automated navigation and log-in to a cooperating third party bill pay service. Such capability may be achieved through hyperlinking. Interface 349 represents a third party bill center where a user has an account. It is noted herein and was described with reference to disclosure of FIG. 18 that in some cases the service of the present invention leverages third party services for bill payment. Interface 349 is intended to represent just one example of such a third party service. This case represents a co-brand situation wherein the entity hosting a third party service reports action and results back to the entity hosting interface 305 of FIG. 17. In this way, even though transactions may be conducted by a third party, results of such transactions may still be incorporated into data aggregated by any hosting interface 305.

Figure 26:
FIG. 26 is an exemplary screen shot of a secondary interface invoked as a result of user interaction with module 349 of FIG. 25 according to an embodiment of the present invention.

FIG. 26 is an exemplary screen shot of a secondary interface 351 invoked as a result of user interaction with module 349 of FIG. 25 according to an embodiment of the present invention. In the event that a third party bill pay service is employed as described in FIG. 25, then a user confirmation interface 351 is provided to appear upon completion of a transaction performed at the third party site. Confirmation interface 351 simply confirms the transaction parameters of the third-party-brokered transaction and provides an opportunity to cancel the transaction. In a preferred embodiment where third party bill payment services are leveraged, the entity hosting interface 305 of FIG. 17 also hosts a cobrand server dedicated to the third party provider. However, the same functionality may be achieved if the third party provider hosts its own server equipment.

Figure 27:
FIG. 27 is an exemplary screen shot of a secondary interface invoked as a result of user interaction with option 327 of FIG. 18 according to another embodiment of the present invention.

FIG. 27 is an exemplary screen shot of a secondary interface 353 invoked as a result of user interaction with option 327 of FIG. 18 according to another embodiment of the present invention. Interface 353 represents a third party service that enables a user to write a virtual check to anyone. It is again noted herein that such third party services are co-branded services according to a preferred embodiment. In this case, selection and invocation of option 327 described in FIG. 18 causes automatic navigation and log-in to the third party providing pay-now services. An additional interface (not shown) may be provided to enter real-time and session specific data about a payee. In this example, interface 353 appears in the general form of a standard check including a data input field labeled Pay to the order of. A drop-down menu provides a list of payees that are configured and saved to memory at the third party system. Input fields are provided for entering payment date, amount ($), and from-account information as illustrated by the associated labels. It is important to note that in preferred embodiments, third-party services if used are co-branded to the main provider such that the main provider actually provides the background software functionality required to successfully perform services.

FIG. 28 is an exemplary screen shot of a third-party interface 355 invoked as a result of user interaction with option 315 of FIG. 18 according to an alternate embodiment of the present invention. Interface 355 represents an exemplary View Bill interface hosted by a third party financial institution cooperating with the bill-pay services described in this specification. In a preferred embodiment, interface 355 is a co-brand interface and actually hosted, in terms of back-end function, by the entity providing interface 305 of FIG. 17. The look and feel of interface 355 may aspire to any design provided by a third-party company. In this case, invocation of option 315 provided in interface 309 of FIG. 18 causes navigation and log-in to a third-party hosted interface for viewing a full accounting of a selected bill.

As previously described above, third party interfaces are not specifically required in order to practice the present invention. All of the interactive functions described as accessible and achievable through proprietary interfaces are provided by the entity hosting bill pay services and account management. Therefore, the third party interface is described in this specification are intended to represent those interfaces and function which may be leveraged from a third party through co-branding services. It is noted herein that third party entities cooperating through a co-brand relationship cannot provide the fully integrated data management functions as taught in this specification and in the co-related specifications listed in the cross-reference section above. Therefore, leveraging of third party services is described in this specification solely for the purpose of explanation of an alternate embodiment for practicing the present invention.

Figure 29:
FIG. 29 is an exemplary screen shot of a secondary interface invoked as a result of user interaction with option 325 of FIG. 18 according to an embodiment of the present invention

FIG. 29 is an exemplary screen shot of a secondary interface 357 invoked as a result of user interaction with option 325 of FIG. 18 according to an embodiment of the present invention. Interface 357 is adapted as an interactive mechanism for enabling a user to set up repeat payments made on a periodic basis to payees wherein the due dates and amounts paid remain constant. Interface 357 contains an interactive icon labeled Add New Repeating Payment. A user invoking this icon is presented with an interactive input form for adding parameters required to set up such an automated payment scenario.

A list of automated payment accounts is provided in line item fashion with disparate data categories separated by columns as described with other interfaces taught in this specification. Reading from left to right, a first column identifies a Payee. A second adjacent column describes a category or type description of the automated bill for each line item. A third column describes the repeating amount of each bill. A fourth column describes a pre-configured frequency for payment of each bill associated with a respective line item. A fifth column describes an end date for termination of an automated bill-pay sequence. And a sixth column identifies an account used to pay bills for each line item. Interactive options provided and associated with each line item include View, Edit, and Delete. Recurring payments interface 357 provides a mechanism for setting up a plurality of automated payments to execute at pre-configured dates in a repetitive fashion.

It will be apparent to one with skill in the art that interface 309, described as a bill payment center, may be provided as a portion of interface suite 305 of FIG. 17, as is the case in a preferred embodiment, without departing from the spirit and scope of the present invention. In one embodiment of the present invention interface 309 may be provided as a stand-alone service. The described practice of embedding links for the purpose of integration between interfaces and between interfaces and third party sites enables many functions to be accessible from multiple points of entry. Likewise, returned data for display is presented in a form to be shared by a plurality of interfaces using the same data.

The method and apparatus of the present invention may be practiced via private individuals on the Internet, businesses operating on a WAN connected to the Internet, businesses operating via private WAN, and so on. There are many customizable situations. The present invention, as taught herein and above, should be afforded the broadest of scope. The spirit and scope of the present invention is limited only by the claims that follow.

What is claimed is:

1. A computerized Internet-connected server storing and executing a software suite for viewing and manipulation of multiple categories of aggregated data compiled from a plurality of data sources and accessible through a single interfacing node operated on the Internet, the software providing a bill-payment module comprising:
    an interactive main interface accessible from the module for listing the bills due and payment accounts accessed by the bill-payment module for paying the bills;
    an interactive history link embedded in the main interface for providing access to a secondary interface for viewing bill history;
    an interactive set-up link embedded in the main interface for providing access to a secondary interface for configuring recurring payments;
    an interactive transfer-funds link embedded in the main interface for providing access to a secondary interface for enabling automated transfer of funds between registered accounts;
    an interactive calendar link embedded in the main interface for providing access to a secondary interface for viewing calendar data;
    a plurality of interactive drop-down menus, each menu associated with a listed bill, the menus providing upon invocation a plurality of selectable, interactive options for treating the listed bill; and
    an interactive refresh-all link embedded in the main interface for enabling selective or complete data refreshing of data displayed in the interface, characterized in that a user operating the main interface from a remote node having access to the Internet may view all aggregated bills and initiate treatment of such bills according to selected interactive options, the treatment ordered by the operating user and performed by proxy by a service entity hosting the interface.

2. The bill-payment module of claim 1, wherein the plurality of data sources are services accessible over the Internet and subscribed to by the operating user.

3. The bill-payment module of claim 2, wherein the accessible services are hosted in file servers addressed on the Internet network.

4. The bill-payment module of claim 3, wherein the remote node is a personal computer with accessibility to the Internet.

5. The bill-payment module of claim 4, wherein the main and secondary interfaces are provided in the form of hyper-text-markup-language.

6. The bill-payment module of claim 3, wherein the remote node is a cellular telephone with accessibility to the Internet.

7. The bill-payment module of claim 3, wherein the remote node is a handheld computer with accessibility to the Internet.

8. The bill-payment module of claim 3, wherein the interactive set-up link provides an additional secondary interface for manually adding new bills to be listed in the main interface for bill payment.

9. The bill-payment module of claim 5, wherein the interactive options for treating a listed bill include viewing a full account of the bill, paying the bill, marking the bill as paid, deleting the bill, obtaining advice regarding selected treatment of the bill, and receiving an alert associated with the bill.

10. The bill-payment module of claim 9, wherein obtaining advice regarding selected treatment of the bill includes calculated and solution-oriented results.

11. If the bill-payment module of claim 9, wherein selection of the option for viewing a full account of the bill causes automated navigation and log-in to a third party site hosting a full accounting of the bill.

* * * * *